United States Patent
Itoh et al.

(10) Patent No.: US 6,820,736 B2
(45) Date of Patent: Nov. 23, 2004

(54) CONVEYING APPARATUS

(75) Inventors: Kazuo Itoh, Kasai (JP); Yoshinori Nagai, Kasai (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 10/425,521

(22) Filed: Apr. 29, 2003

(65) Prior Publication Data

US 2003/0209410 A1 Nov. 13, 2003

(30) Foreign Application Priority Data

May 8, 2002 (JP) ...................................... 2002-132363

(51) Int. Cl.$^7$ ............................................... B65G 13/06
(52) U.S. Cl. ............. 198/781.01; 198/780; 198/781.02; 198/781.05
(58) Field of Search ........................... 198/780, 781.01, 198/781.02, 781.05, 781.06

(56) References Cited

U.S. PATENT DOCUMENTS

| | | | |
|---|---|---|---|
| 5,228,558 A | | 7/1993 | Hall |
| 5,862,907 A | | 1/1999 | Taylor |
| 5,960,930 A | * | 10/1999 | Hawkins ..................... 198/577 |
| 6,035,999 A | | 3/2000 | Hall |
| 6,378,694 B1 | | 4/2002 | Onoyama et al. |
| 6,415,914 B2 | * | 7/2002 | Itoh et al. .............. 198/781.06 |

FOREIGN PATENT DOCUMENTS

JP     2000 335730     12/2000

* cited by examiner

*Primary Examiner*—Richard Ridley
(74) *Attorney, Agent, or Firm*—Wood, Phillips, Katz, Clark & Mortimer

(57) ABSTRACT

A conveying apparatus (1) is composed of several conveying modules (2) each having a controller (40) for control of a motorized roller (6) having a motor (16) incorporated in it. A motor-controlling section (45) installed in the controller (40) operates to sense an article being transported on and along the module (2). An article-state detector (48) included in the motor-controlling section (45) compares the actual number (Pr) of signal pulses indicating the number of rotations of the motor (16) with a standard number (P) of such pulses, when judging whether the article is or is not on the module, without aid of any conventional and discrete prior art sensors.

23 Claims, 15 Drawing Sheets

CONVEYING APPARATUS

BACKGROUND OF THE INVENTION

1. Field of the Invention

The present invention relates to a conveying apparatus composed of a plurality of rollers, and more particularly relates to a conveying apparatus composed of a plurality of rollers and characterized by a controller that controls the operative performance of said conveying apparatus.

2. Relevant Prior Art

Various types of conveying apparatuses have widely been used in industries wherein each apparatus was composed of a plurality of rollers as illustrated in FIG. 13. This conveying apparatus 100 comprises a pair of frames 101 disposed in parallel with each other and supporting between them the rollers 102 and 103. Some of those rollers 102 are free rollers capable of rotating freely relative to their shafts. The other rollers 103 are each a motor-installed roller that has secured therein a motor and a speed reducer, so that this motor actuates each roller 103 to positively rotate about its axis.

Such a conveying apparatus 100 comprises also a plurality of sensors 105 arranged on and along the frame 105. Each sensor 101 such as a photosensitive sensor will detect every article advancing on and along the conveying apparatus 100.

The conveying apparatus 100 further comprises a terminal or distal controller 106 for controlling the operation of those motor-installed rollers (hereinafter called "motorized rollers") 103. A supervising or central control system such as a programmable controller not shown is connected to the terminal controller 106. The central control system will judge or determine whether any article is being conveyed on the apparatus 100, on the basis of data signals from the sensors 105. If any article is detected in this way, then the motorized rollers 103 will be actuated.

The so-called singulation mode and slug mode are known in the art as the methods of synchronously or simultaneously transporting a plurality of articles.

In the singulation mode, at least one empty or idle zone is interposed moment by moment between the two adjacent zones currently acting to transport the articles. Rollers of one zone will be put into operation, only where any article is detected on this zone, but no article is detected on the downstream zone.

In the slug mode, the formation of every row of the articles being conveyed does remain unchanged, during transportation of them from one zone to the adjacent downstream zone. Whether any article is present or absent on the downstream zone, the rollers of the one zone will be actuated. However, this principle does not apply to the downstream end region of such a transportation line.

Usually and ordinarily, a braking mechanism is installed in at least one of the rollers constituting such an end region. A brake shoe or the like will electrically be actuated to stop the roller's cylindrical body due to friction thereof with said shoe, thereby causing every article to make a pause at such an end region.

The prior art conveying apparatus 100 necessitates the sensors 105 for detection of conveyed articles have to be disposed on the frame 101, in addition to the free and motorized rollers 102 and 103 in charge of transportation of the articles. In order to convey said articles accurately to their destinations, a lot of sensors 105 need to be attached to the frame 101. Thus, the conveying apparatus 100 must be constructed using many and various constituent parts such as the free and motorized rollers 102 and 103, the sensors 105, the terminal controller 106 and cables for connection thereof to these sensors. Such a considerably large number of constituent parts have rendered complicated the prior art conveying apparatus, consequently and problematically making it intricate and expensive to assemble the apparatus.

SUMMARY OF THE INVENTION

An object of the present invention made to resolve this problem is therefore to provide such a conveying apparatus that articles being conveyed on and along it can be detected without aid of sensors or any devices relevant thereto.

In order to achieve this object, and viewed from an aspect of the invention, it provides a conveying apparatus comprising a plurality of rollers for conveying an article, a motor for driving at least one of the rollers, and a controller for controlling the action of the motor. The controller comprises a rotation detector for obtaining an actual information with respect to rotating state of any of the rollers. The controller further comprises an article-state detector such that the actual information will be compared with a standard value representing normal rotations of the roller. On the basis of a difference thus found between the actual information and the standard value, current material state of the article being conveyed will be determined.

The term "rotating state" used above does inclusively denotes velocity, direction, acceleration/deceleration, angular distance, duration and the like of rotation of the roller. The other term "material state" does also inclusively denotes presence/absence of the article at any selected position of the apparatus, and weight of the article, as well as normality/abnormality in motion of the article being conveyed, and these definitions apply to the descriptions given hereinafter.

The present apparatus does not need any discrete sensors inherent in the prior art apparatuses, but nevertheless the material state can be detected to conduct adequate transportation of the article.

Due to elimination of the prior art sensors and relevant devices, the number of constituent parts is reduced in this conveying apparatus, rendering it simple in structure, easy to assemble and maintain, and thus inexpensive to manufacture.

Preferably, the rotation detector may be constructed such that the rotating state of the roller is determined based on an information indicating the rotational condition of the motor.

The term "rotational condition" just used above does inclusively denotes velocity, direction, acceleration/deceleration, angular distance, duration and the like of rotation of the motor.

The rotating state of the roller is thus easily obtained by directly obtaining the rotational condition of the motor. In a case wherein a speed reducer intervenes between the motor and roller, the motor will rotate at a higher speed than the roller. Even any slight change in the roller's rotating state can be caught in this case based on such a direct detection of the motor's rotational condition.

Preferably, the controller may determine whether any article is or is not present on the conveying apparatus, by comparing an actual rotating state of the roller with a preset reference value. This actual state is detected by the rotation detector as noted above, and the preset reference corresponds to an empty state of the apparatus not loaded with any article.

The actual rotating state of the roller is thus utilized to know the presence/absence of the article. Therefore, the present apparatus does no longer need any discrete sensors inherent in the prior art apparatuses, but nevertheless the material state can be detected to exactly transport the article to its desired destination.

The reference value to be preset may be obtained by measurement of idle rotations, i.e., rotations when loaded with no article, of the motor.

Also preferably, the controller may decide that the article has collided with any obstacle, when the rotation detector eventually outputs a much smaller number of rotations of the roller than a normal reference value.

Any accidents or events (such as jamming) that the article has collided with any obstacle will thus be detected automatically in this apparatus, thereby alarming an operator and/or turning off the motor so as to avoid energy loss and ensure smooth transportation.

Preferably, the controller may intentionally shift the rotational condition of the motor for the purpose of test, from stationary mode to forward rotary mode, or vice versa, from forward to reversed rotary mode, or vice versa, from a faster to a slower rotary mode, or vice versa. Any actual change found in the motor thus shifted, possibly with respect to load or the like parameter, will be used to know a current rotating state of the roller.

The article on the conveyor will not be able to follow such a sudden change in the rotating state of roller, with this change being caused by the shift of rotational condition of motor. In such an event, the roller's inertial force acting on the motor will be added to a normal rotational resistance which the article is always imparting to this motor. If any article is on the roller, then a stronger braking force will be imposed on the motor, thus causing it to make a sharper change in its rotational condition. Conversely speaking, the presence/absence of article can be detected more precisely by causing the motor to make such an intentional and sudden change in its rotational condition.

Preferably, the controller may cause at given regular intervals of time, or periodically, the motor to make such an intentional and sudden change in its rotational condition in order to check the rotating state of roller.

Accurate detection of article will be enabled in such an electrical structure of the controller, without being affected by any variation in weight or shape of the articles.

Preferably, a signal pulse train may be generated in response to rotations of the motor that is driving the roller to rotate. The rotation detector in this case will count up the number of signal pulses output in a time from the motor to determine the actual rotational speed of the roller.

In the conveying apparatus of this type, the rotational speed and any change occurring therein will be detected surely, accurately and reliably. By virtue of this feature, the information on the rotating state of roller, particularly a change in its rotational speed, to know the state of the article then moving on and along the apparatus.

Also preferably, a signal pulse train may be generated in response to rotations of the motor, and the rotation detector will obtain the information on the roller's rotating state on the basis of such pulses. The article-state detector in this case will compare the detected number of actual signal pulses with a reference number of pulses in idle operation. If the actual number is quite equal or nearly equal to each other, then this conveying apparatus will be regarded as being empty. The reference number of pulses may be one that has been determined based on measurement on this apparatus in idle operation without loaded with any article.

The term "nearly equal" just used above means that a difference found between the actual and reference numbers is the same as or smaller than a given limit. This limit may previously be obtained by experiments, and therefore a very simple standard is used herein to know whether any article is or is not on a particular module. The same or similar term and limit apply also to the following descriptions.

Also preferably, the signal pulse train may be generated in response to rotations of the motor, and the rotation detector monitoring the roller's rotating state on the basis of such pulses. The article-state detector in this case will also compare the detected number of the actual pulses with the reference number of pulses for idle operation of said module. If a difference between the actual number and reference number is equal to or less than another limit, then the module of apparatus will be regarded as being loaded with any article.

Thus, a simple standard is used also in this case to know whether any article is or is not on a particular module.

Also preferably, a signal pulse train may be generated in response to rotations of the motor, and the rotation detector may monitor the roller's state on the basis of such pulses. The article-state detector compares a reference value with the actual number of pulses having been counted up during a predetermined length of time just after operation of the motor for another predetermined length of time, so that if the actual number is less than the reference value, then the article on that module will be regarded as having collided with any obstacle.

Any jamming trouble of this apparatus will now be detected automatically in this way, so that the operator may be alarmed or the motor be stopped to ensure smooth transportation and avoid energy loss.

Further preferably, the signal pulse train may be generated in response to rotations of the motor, and the rotation detector monitoring the roller's state also on the basis of such pulses. The article-state detector in this case will compare the actual numbers of pulses, one of which numbers been counted up during a unit time of forward operation, with the other actual number being measured after rotational direction is reversed. Also in this case, a difference found between these numbers will be utilized to know whether any article is present or absent on that module.

In a case wherein any article is moving on and along this apparatus, the article's inertial force being imparted to the motor will be of such an intensity that it is difficult for this article to make a sharp change in rotational direction from forward to rearward. A difference found between the number of pulses generated during a period of forward rotations and that generated during rearward rotations will be rendered considerably larger, as compared with that which will be observed during this apparatus' idle operation without any article thereon. Thus, such a difference will be useful to exactly judge presence/absence of said article.

The heavier the article on the conveying apparatus, the stronger is its inertial force acting on the motor so that the number of pulses which it generates will decrease noticeably. Weight of articles can be determined based on this fact.

Preferably, the rollers constituting the conveying apparatus may be put into operation, on condition that any article is on said apparatus.

Smooth transportation of articles along this conveying apparatus will be rendered sufficiently smooth in this way.

It also is preferable that the conveying apparatus of the invention does comprise a plurality of conveying zones arranged to form a row. Each conveying zone comprises a plurality of rollers for conveying an article, a motor for driving at least one of the rollers, and a controller for controlling the action of the motor. Each of such controllers disposed in the respective zones is adapted to receive the data or information generated in the adjacent zones with respect to presence/absence of the articles.

Each zone of this conveying apparatus has its own controller, so that the position of every article can be adjusted exactly even if it is shorter than each zone. During such transportation of short articles, the controllers in respective zones will function in harmony with each other. Respective articles are detected as to their position in the respective zones, and each group of rollers are turned on or off independently of the other groups of rollers. Those relatively short articles are thus conveyed successively and precisely in position, not to collide with each other.

Each controller in this apparatus will receive from the adjacent zones certain signals indicating presence/absence of any article or a portion thereof in those adjacent zones. Even if every article is relatively long and extends over one or more zones, it can be transported smoothly along this apparatus. This is because the controllers disposed in the adjacent zones will function in harmony with each other so that their groups of rollers are driven or stopped for example in a synchronous manner.

As just summarized above, each zone of this conveying apparatus has its own controller, and each controller in this zone will receive from the adjacent zones certain signals indicating presence/absence of any article or a portion thereof in those adjacent zones. Thanks to these characteristic features, any supervising controller such as programmable computers em-ployed in the prior art apparatuses can now be dispensed with, rendering the present apparatus simpler in structure and making it easy to change the layout of its conveying modules.

Preferably, each of the controllers may comprise an adjacent-zone inspector and an action commander. If and when the article is found on an upstream zone, an action commander in the controller of a downstream zone will generate and transmit a transportation commanding signal to another action commander in the other controller of the upstream zone. In this manner, the action commander in the upstream zone will operate to turn on the motor therein to drive and rotate the at least one roller belonging to the upstream zone.

In other words, a duty signal indicating the current state of downstream zone will be delivered to the upstream zone so as to drive the motor installed therein, causing the article to advance towards the downstream zone. In this way, position of articles being transported will be regulated precisely, protecting them from collision with each other.

Preferably, even while power supply to the motor remains cut off, the roller may possibly and forcibly be driven to rotate on condition that the rotation detector for that motor detects rotations thereof, resuming power supply to the motor.

In detail, if and when any article tends to enter a conveying apparatus or a zone thereof in issue from the adjacent apparatus or its zone, or if and when any external force is applied to any article on the apparatus in issue, the rollers will be driven positively to start rotation. Resultant passive rotations of the motor will then be detected by the rotation detector for this motor, resuming power supply even if it has been switched off. Thus, with any article coming from the upstream apparatus or a zone thereof, the rollers in the downstream zone will then be actuated to smoothly take the article into this zone. With any external or foreign force being intentionally applied to any article towards the downstream zone, the rollers will likewise be put into a positive motion, thus lowering magnitude of said foreign force.

Preferably, the apparatus includes at least one of the rollers that serves as a brake and is driven by a motor, which in turn is regulated by a controller. This controller comprises a rotation detector for monitoring rotations of the motor. This motor will be caused on demand to rotate in a reverse direction opposite to the normal direction of the roller's forward rotations, thereby simply braking the roller.

In this case, the apparatus does not need any ordinary and electrically driven mechanical brake shoe or the like. Articles on this apparatus having been switched off will be ready to manual displacement while doing maintenance operations. The present braking mechanism devoid of mechanical brake shoes and discrete additional position sensors will render this apparatus simpler in structure, nevertheless enabling the article to make a temporary stop at any given point.

Preferably, at least one -of rollers constituting the conveying apparatus may be composed of a fixed shaft, a roller body capable of rotating freely relative to the shaft, and a motor accommodated in the roller body. A torque of the motor will be transmitted to the roller body, making it spin about the shaft, when the motor is actuated.

Such a motorized roller simplifies the apparatus and renders it compacted.

From a further aspect of the invention, it provides in order to achieve the object set forth hereinbefore a conveying apparatus comprising a plurality of rollers for conveying an article, a motor for driving at least one of the rollers, and a controller for controlling the action of the motor. The controller comprises a rotation detector for obtaining an actual information with respect to rotational condition of the motor. The controller further comprises an article-state detector such that the actual information will be compared with a reference value representing idle rotations of the motor. On the basis of a difference thus found between the actual information and the reference value, presence/absence of the article on the apparatus will be determined.

The rotation detector functions to depict the motor's rotational condition adapted to know the presence/absence of the article on the apparatus. Thus, the present apparatus does not need any discrete and ordinary sensors inherent in the prior art apparatuses, nevertheless affording detection of the article and adequately transporting it to its desired destination.

Due to elimination of the prior art sensors and relevant devices, the number of constituent parts is reduced in this conveying apparatus, rendering it simple in structure, easy to assemble and maintain, and thus inexpensive to manufacture.

Preferably, the controller may intentionally shift the rotational condition of the motor for the purpose of test, from stationary mode to forward rotary mode, or vice versa, from forward to reversed rotary mode, or vice versa, from faster to slower rotary mode, or vice versa.

The article on the conveyor will not be able to follow such a sudden change in the rotational condition of motor. In such an event, the article's inertial force acting on the motor will be added to a normal rotational resistance which the article's weight is always imparting to this motor. If any article is on the roller, then a stronger braking force will be imposed on the motor, thus showing a sharper change in its rotational condition. Conversely speaking, the presence/absence of article can be detected more precisely by causing such a sudden change in rotational condition of motor.

Also preferably, a signal pulse train may be generated in response to rotations of the motor, and the rotation detector will obtain the information on the roller's rotating state on the basis of such pulses. The article-state detector will compare the detected number of actual signal pulses with a reference number of pulses in idle operation. If the actual number is quite equal or nearly equal to each other, then this conveying apparatus will be regarded as being empty. The reference number of pulses may be one that has been determined based on measurement on this apparatus in idle operation without loaded with any article.

Such a simple standard is used herein to know whether any article is or is not on a particular module of the conveying apparatus.

Also preferably, the signal pulse train may be generated in response to rotations of the motor, and the rotation detector may obtain information on the roller's rotating state on the basis of such pulses. The article-state detector in this case will also compare the detected number of the actual pulses with the reference number of pulses for idle operation of said module. If a difference between the actual number and reference number is equal to or less than another limit, then the module of apparatus will be regarded as being loaded with any article.

Thus, a simple standard is used also in this case to know whether any article is or is not on a particular module.

From a still further aspect of the invention, it provides a conveying apparatus that comprises a plurality of rollers for conveying an article, a motor for driving at least one of the rollers, and a controller for controlling the action of the motor. This controller may comprise a rotation detector for obtaining an actual information with respect to rotational condition of the motor, as well as a collision indicator such that a reference value is compared with the actual number of pulses having been measured during a predetermined length of time when the motor is expected to rotate, so that if the actual number is less than the reference value, then the article on that module will be regarded as having collided with any obstacle.

Jamming troubles of this apparatus will now be detected automatically in this way, so that the operator may be alarmed or the motor be stopped to ensure smooth transportation and avoid energy loss.

Preferably, the controller may intentionally shift the rotational condition of the motor for the purpose of test, from stationary mode to forward rotary mode, or vice versa, from forward to reversed rotary mode, or vice versa, from faster to slower rotary mode, or vice versa.

In this way, the presence/absence of article can be detected more precisely.

THE PREFERRED EMBODIMENTS

Figure 1:
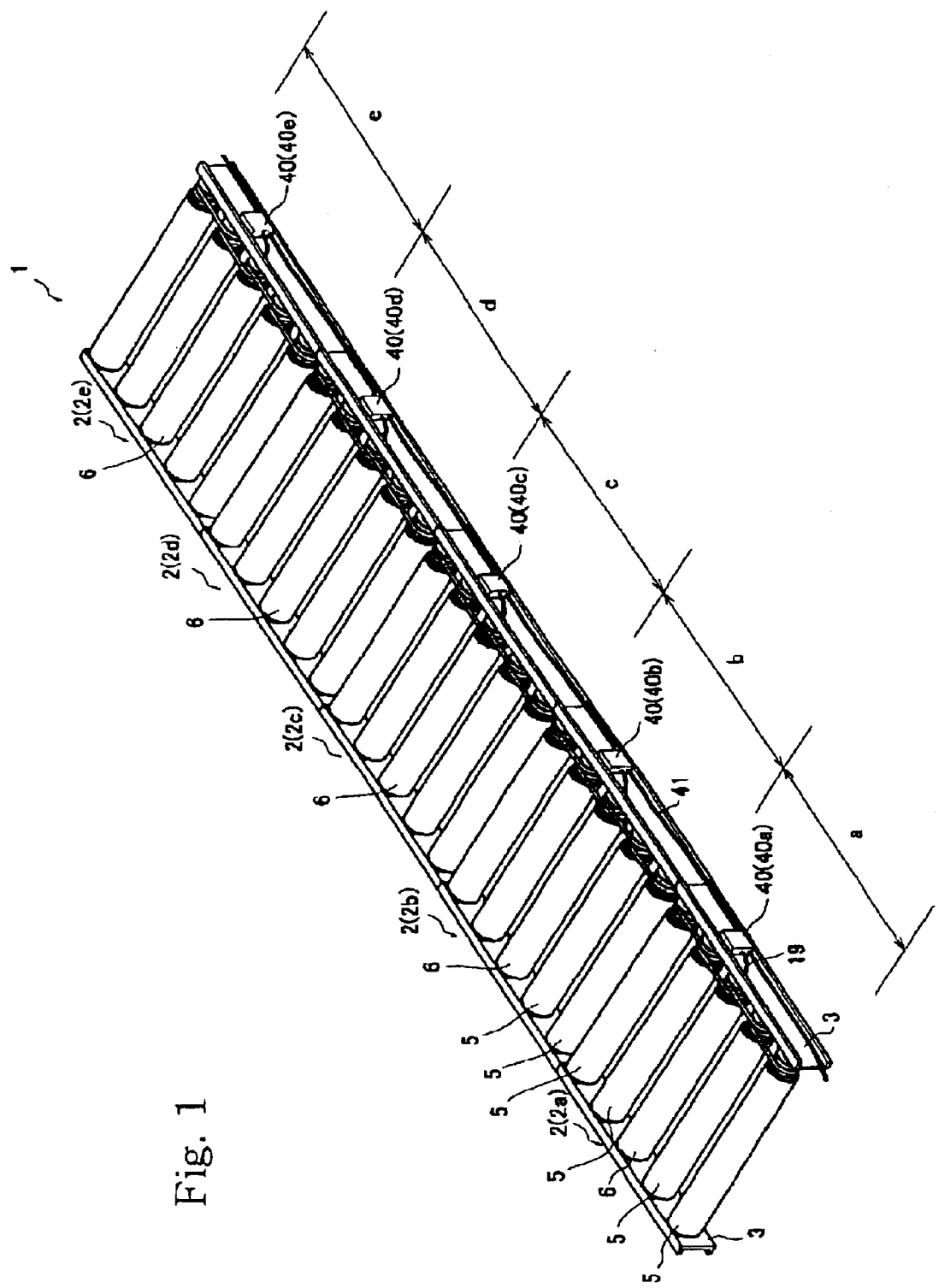
FIG. 1 is a perspective view of a conveying apparatus provided in accordance with an embodiment of the present invention.

Now, some embodiments of the present invention will be described in detail referring to the drawings.

A conveying apparatus 1 consists of 5 (five) modules 2 (viz., 2*a*, 2*b*, 2*c*, 2*d* and 2*e*) that are connected one to another in this order along the conveying line, in an example shown in FIG. 1. In other words, such a conveying line is divided into five sequential unit zones 'a', 'b', 'c', 'd' and 'e' arranged in this order. Each module 2 is composed of 4 (four) free rollers 5 and 1 (one) motorized roller 6 that are supported in parallel by and between frames 3 and 3 extending in parallel with each other. In each module 2 defining one of the unit zones of the conveying line, the motorized roller 6 is disposed at the point midway in this unit zone in a direction of article transportation. Two of the free rollers 5 lie on a forward side of each motorized roller 6, with the other two free rollers lying on a rearward side of this motorized roller, all in parallel with each other.

Each free or passively rotating driven roller 5 (hereinafter called as "driven roller") is composed of a cylindrical body 7 that is a length of metallic cylinder. Normally open opposite ends of the cylindrical body are closed with caps 8 and 10, and these caps are firmly inserted in and fixedly secured to said ends to be integral therewith. Shaft segments 13 and 15 fixed in position do penetrate those caps, from the inside to the outside of cylindrical body 7. Formed in and around one of the caps 8 are pulley grooves 11 and 12, but the cylindrical body 7 rotate freely relative to those shaft segments 13 and 15.

Figure 2:
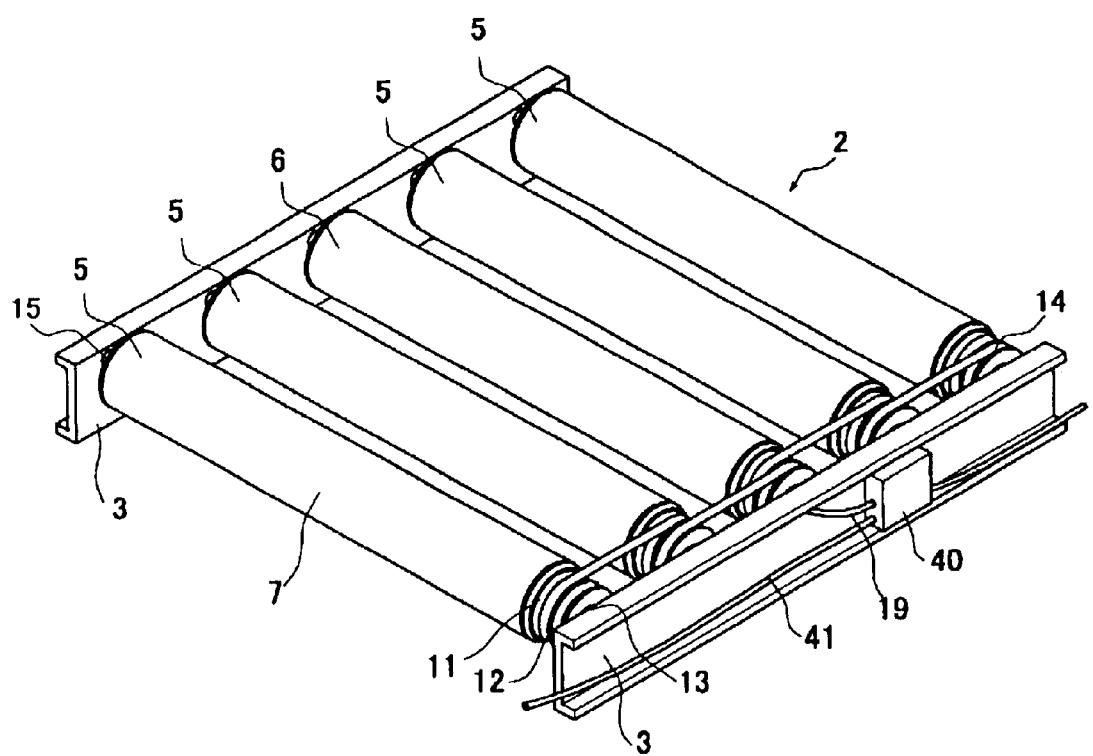
FIG. 2 is a perspective view of one of modules that constitute the apparatus shown in FIG. 1.
Figure 3:
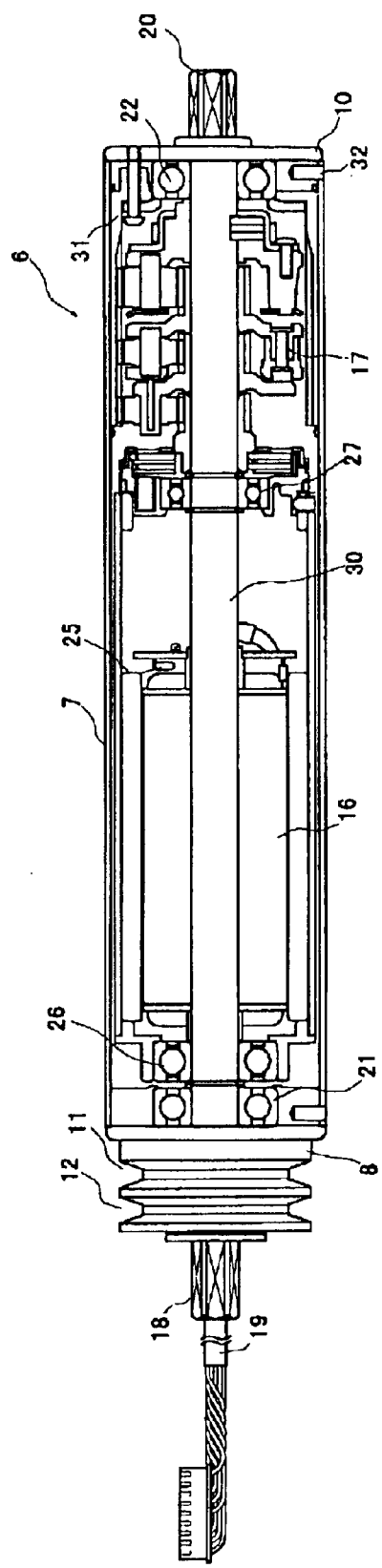
FIG. 3 is a cross section of a motorized roller employed in the module shown in FIG. 2.

As will be seen in FIGS. 2 and 3, and similarly to the passively rotating free rollers 5, the motorized roller 6 also comprises a metallic cylindrical body 7 and a pair of caps 8 and 10 firmly closing the opposite ends of this body. Installed in the cylindrical body 7 of motorized roller are an electric motor 16 and a speed reducer 17. Fixed shaft segments 18 and 20 extend through those caps 8 and 10, from the inside to the outside of cylindrical body 7. A bearing 21 supports one of the fixed shaft segments 18, permitting it to rotate freely relative to the cap 8. This shaft segment 18 is a hollow piece (though not shown in the drawings), through which a composite cable 19 extends outwards to supply the motor 16 with an electric current and to transmit electric signals from a Hall-effect element or elements 28, as detailed below, or to the motor 6. The other fixed shaft segment 20 is a solid piece supported by a further bearing 22 so as to rotate freely relative to the cap 10.

Each module 2 of the conveying line comprises, as mentioned above, the two passively rotating free rollers 5, the motorized roller 6 and the two further free rollers 5, arranged in parallel and side by side in this order. Belts 14 spanned between the two adjacent free rollers 5 or between one of them and the motorized roller 6 are in a frictional engagement with two pulley grooves 11 or 12 of the adjacent caps 8. The middle motorized roller 6 will exert a torque to the free rollers 5, through those belts 14. Thus, all of these rollers 5 and 6 are caused to rotate in unison and in one and the same direction. Although the illustrated example employs such belts 14, they may be dispensed with in other examples not shown but included in the present invention.

The motor 16 is a three-phase four-wire motor of the brush-less type comprising a plurality of stators (not shown) that are electromagnets, a rotor (not shown) with magnetic poles and an angular position sensor 25. A shaft 30 of this motor 16 has opposite ends, one of which is supported with a still further bearing 26 so as to rotate relative to the fixed shaft segment 18. The other end of the shaft 30 connected to the rotor is supported with a yet another bearing 27, and is operatively connected to an input side of the reducer 17. Rotational speed of a torque which the rotor will exert is decreased by the reducer 17, before applied to the roller body 7. The angular position sensor 25 located close to the rotor will operate to detect the angular position of the magnetic poles of the rotor, thereby successively generating a series of pole position signals.

The angular position sensor 25 is composed of three Hall-ICs 28 (28A–28C), and each Hall-IC comprises one Hall-effect element integrated with an entirety of or a part of power switching circuit. In detail, each Hall-IC 28 comprises, in addition to the Hall element to detect intensity of magnetic field, an amplifier for amplifying weak signals transmitted from this element. Hall-IC 28 further comprises a Schmitt trigger circuit for converting the amplified signals into a square wave, a stabilizer circuit and a temperature-compensating circuit. The number of such Hall-ICs 28A–28C is not limited to 3 (three) as in the illustrated example, but may be more or less than 3. The angular position sensor 25 for detecting the magnetic pole position is not limited to the magnetic type using the described Hall-ICs 28A–28C. Thus, the position sensor 25 may be of any other type such as the photo-interrupter type using light-emitting diodes and photosensitive elements, or the inductance type using magnetic saturation elements.

The speed reducer 17 is a planetary gear train adapted to decrease the output rotational speed of the motor 16 at any desired ratios. The shaft 30 of this motor is operatively connected by a connector 31 to the cap 10, so that the torque output from the motor 16 is slowed down by the reducer 17 and then input to this cap 10 through the connector 31. Pins 32 fixedly secure the cap to the roller body 7, so that the torque imparted to this cap will drive this roller body in unison therewith.

Power supply to the motor 16, as well as transmission of signals to or from this motor or Hall-effect elements of Hall-ICs 28A–28C, are conducted through a cable 19 that leads to a controller 40 fixed on the frame 3. The controller 40 may be composed of a CMOS IC or CMOS ICs, or a digital circuit using differentiating circuits and/or integrating circuits, and if necessary, a microcomputer may be utilized to operate the controller.

Such controllers 40 are disposed in the respective conveying modules 2a to 2e, and connected to the respective cables 19 leading to the motorized rollers 6 functioning as power sources. Two adjacent controllers 40 belonging to the neighboring modules 2 (may be referred to hereinafter and sometimes as controllers 40a, 40b, 40c, 40d or 40e, if necessary) communicate with each other through a communication cable 41.

Such controllers 40 work to drive or stop the motorized rollers 6 in the respective modules 2, independently of each other. A structural feature characteristic to the present conveying apparatus 1 now being described is a motor-controlling section 45. This section formed in each controller 40 so as to sense an article on the module 2 does render the invention distinctive well over the prior art apparatuses, as will be apparent from the following description.

Figure 4:
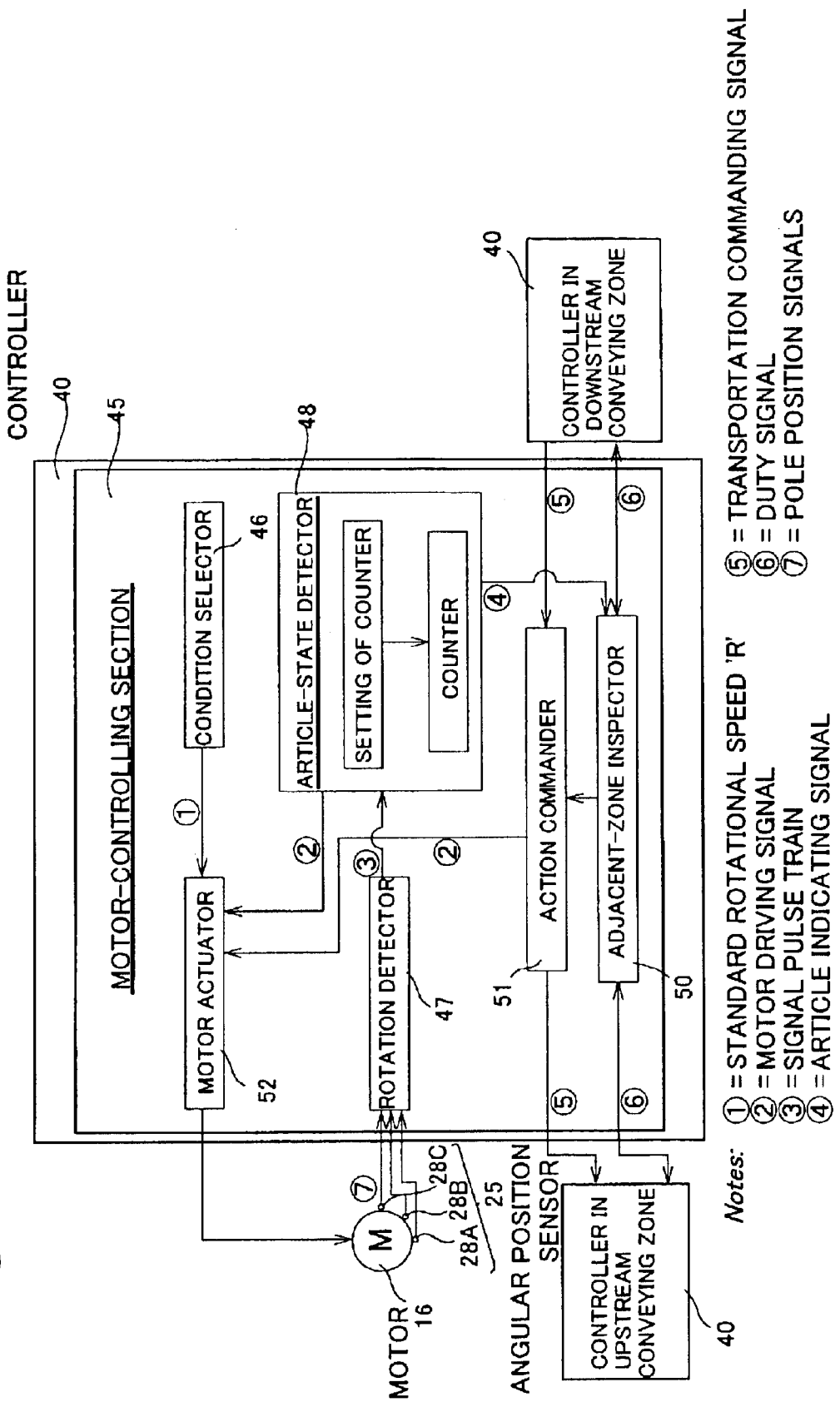
FIG. 4 is a block diagram of a circuit controlling the module shown in FIG. 2.

The motor-controlling section 45 as a principal portion of the controller 40 for control of individual conveying module 2 is composed of such components as shown in FIG. 4. These components are a condition selector 46, a rotation detector 47, an article-state detector 48, an adjacent-zone inspector 50, an action commander 51, and a motor actuator 52. The condition selector 46 comprises a variable resistor (not shown) to regulate a voltage applied to the motor 16. The voltage (viz., a standard voltage) charged upon the motor will be adjusted by varying the value of resistance by means of the condition selector 46, so as to make it possible for the section 45 to sense the article.

The rotation detector 47 connected to the angular position sensor 25 will receive the pole position signals emitted from the Hall-ICs 28 and convert them into a pulse train fed to the article-state detector 48. In a case wherein the conveying module 23 is empty without bearing any articles while the motor-controlling section 45 is kept on to detect them, a standard number 'P' of signal pulses per a predetermined length of time, for example, unit time, will be input to the article-state detector 48.

The article-state detector 48 can count the number of signal pulses delivered from the rotation detector 47, thus giving an actual number 'Pr' of pulses per the predetermined length of time. This number 'Pr' will be compared in and by the article-state detector 48 with the standard number 'P' of signal pulses per unit time, wherein the latter number 'P' is expected for the motor 16 operating with the standard voltage 'V' but without any load. Such a comparison is performed to determine or to judge whether any article is then on the conveying module 2. In more detail, if these numbers are quite equal to each other, then this module will be regarded by the article-state detector 48 as being empty. If the former number 'Pr' is smaller than the latter number 'P' by at least one pulse, then said module 2 is determined to be loaded with any article. The result of comparison forms an information indicative of presence or absence of the article, and the article-state detector 48 will deliver such an article indicating information to the adjacent-zone inspector 50.

When the article-state detector 48 in one zone receives any signal pulses while the motor 16 is not operating with any current but remains idle, this detector will determine that any article is transferring from an upstream conveying module 2 to the one zone, or that any external force is acting on the article to move it forwards. As a result, a motor activating command signal will be forwarded to the motor actuator 52 from said detector 48, thereby driving the roller 6 to begin its rotation so as to take the article into the one zone.

The adjacent-zone inspector 50 thus receiving the article indicating information from the article-state detector 48 in the one zone will produce a duty signal that is an information indicating the loaded state of the one zone. This duty signal will then be input to the controllers 40 for the adjacent modules 2, while receiving other similar duty signals from these adjacent modules. Thus, transmission of such duty signals between adjacent modules 2 renders the conveying apparatus 1 cognizant of its own overall loaded state.

The one module or zone having such an action commander 51 is located close to and between an upstream module 2 (hereinafter some-times referred to as 'an upstream zone') and a downstream one (likewise referred to as 'a downstream zone'). If the upstream zone is loaded with an article and the one zone is empty, then a transportation commanding signal will be output from the one zone and input to the upstream zone. If the action commander of the one zone receives from the other action commander 51 in the downstream zone another transportation commanding signal, it will give a motor driving signal to the motor actuator 52 (detailed below). Each action commander 51 operates in this manner to receive or output the transportation commanding signals so as to subsequently emit the motor driving signal to be fed to the motor actuator.

The motor actuator 52 functions to drive the motor 16 to rotate at a given speed and for a given time 'T1' on the basis of those motor driving signals from the condition selector 46, article-state detector 48 and action commander 51.

Sequential operations of such a conveying apparatus 1 will be detailed further, referring to the drawings. FIG. 5(a) shows a first stage of the apparatus 1, with FIGS. 5(b) and 5(c) respectively showing a second and third stages thereof, wherein a hatched rectangular portion indicative of an article being conveyed. The reference numerals including '40' and so on representing the controller and its relevant components will be accompanied by suffix 'a', 'b', 'c', 'd' or 'e', for the purpose of concise and clearer description of them.

With the main switch (not shown) of the conveying apparatus 1 being turned on, the condition selector 46 will give the motor actuator 52 a motor driving signal in accordance with the value of resistance that has been preset using the variable resistor. This actuator 52 will consequently apply the standard voltage 'V' to the motor 16, based on such a motor driving signal, so as to start it. Simultaneously with this step, the counter in the article-state detector 48 will begin its operation.

As the motor 16 starts to rotate, the angular position sensor 25 generates a series of successive pole position signals to be input to the rotation detector 47. These signals are processed therein to give a pulse train of signal pulses, which in turn will be delivered to the article-state detector 48.

This article-state detector 48 counts up the signal pulses fed from the rotation detector 47 so as to determine the actual number 'Pr' of the signal pulses that have been generated due to rotation of the motor 16. Such an actual number will then be compared with the standard number 'P' of signal pulses for the motor 16 operating with the standard voltage 'V'. The article-state detector 48 in issue will regard the module 2 as being empty, if the former number 'Pr' is quite equal or nearly equal to the latter 'P'. If in contrast the former number 'Pr' is smaller than the latter 'P', then said module 2 in issue will be deemed to be transporting any article.

In more detail, if an article is put on the conveying module 2a as shown in FIG. 5(a), then this article will exert a resistance against rotation of the motorized roller 6 (referred to as the motorized roller 6a hereinafter) of this module. Consequently, rotational speed of the motor 16 installed in this motorized roller 6a will become slower as compared with a case wherein no load is applied to this module. Thus, the actual number 'Pr' of rotation-indicating signal pulses detected by the article-state detector 48 will decrease to be lower than the standard number 'P'.

On the other hand, the succeeding modules 2b to 2e free of the article have respective motorized rollers 6 (hereinafter called 'motorized rollers 6b to 6e', respectively), to which no resistance acts against their rotation. Thus, the actual rotation numbers 'Pr' of each motorized roller 6b to 6e that are being monitored by the respective motor-controlling section 45 will remain substantially equal to the standard number 'P'.

The article-state detector 48 generates an information indicative of presence or absence of the article, and delivers such an article indicating signal or information to the adjacent-zone inspector 50 in the one module. This article indicating information will then be transmitted to the other adjacent-zone inspector 50 belonging to the other controllers 40 of the adjacent modules 2, through the respective communication cables 41. In the state illustrated in FIG. 5(a), the controller 40a of the module 2a will receive the article indicating information from the adjacent controller 40b, and consequently recognize that the module 2b is empty. Similarly, each of those controllers 40b to 40e will receive such article indicating informations from the controllers 40 of adjacent modules 2. As a result, the controller 40b becomes cognizant of the fact that the article is currently just on the adjacent module 2a.

With the adjacent-zone inspector 50b of the controller 40b becoming cognizant the article on the end module 2a, the action commander 51b of controller 40b will give the other commander 51a of controller 40a a transportation commanding signal. Based on the signal, the latter commander 51a will input a motor activating command signal into the motor actuator 52a. As a result, the motor 16 will be kept in rotation to drive the motorized roller 6a until the commanding signal from the controller 40b stops. In unison with this motorized roller 6a, the driven rollers 5 of module 2a will continue to rotate also for the given time, so that the article moves towards the next module 2b.

As the article on the module 2a starts to advance forwards, a forward end portion of this article will move onto the next module 2b as shown in FIG. 5(b). Consequently, the driven rollers 5 and motorized roller 6 of the module 2b are forced by this article to spin about their own axes, respectively, due to their frictional resistance against said article.

As the motorized roller 6b that has been still in the next zone is forced to rotate, the electric motor 16b installed in the roller body 7b will be brought into a forced rotation. As a result of such a forced rotation, the angular position sensor 25b emits pole position signals towards the controller 40b of the next conveying module 2b. These signals will then be detected by the rotation detector 47b and processed therein to form a pulse train, which is subsequently output to the article-state detector 48*b*.

Figure 5:
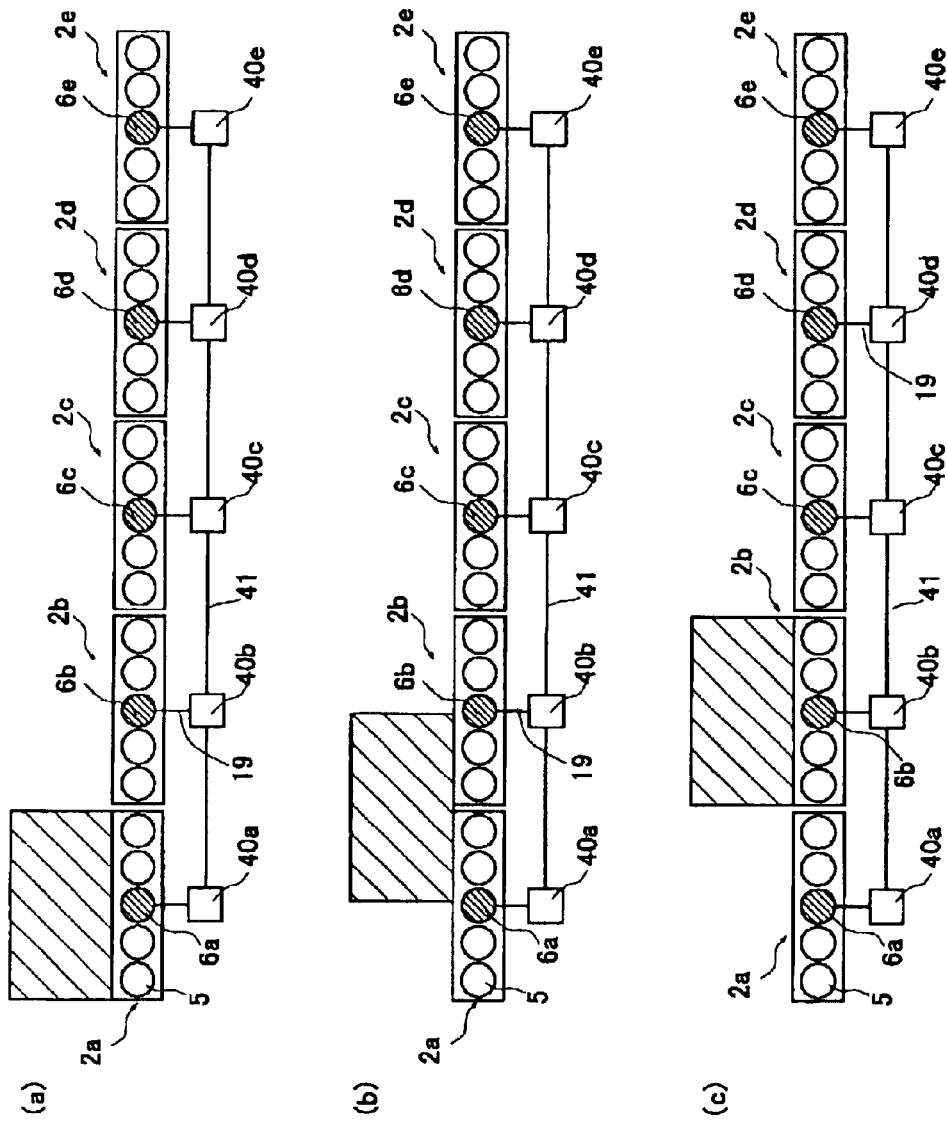
FIGS. 5(*a*) to 5(*c*) are schemes illustrating an article that is being conveyed on the apparatus of FIG. 1, in which FIG. 5(*a*) shows a first stage of transportation of the article, and FIGS. 5(*b*) and 5(*c*) respectively show a second and third stages.

With the article-state detector 48*b* receiving such a pulse train of pole position signals from the rotation detector 47*b*, it will recognize that the article is just leaving the upstream module 2*a* so as to enter the said next module 2*b*. Thus, the article-state detector 48*b* inputs a motor driving signal to the motor actuator 52*b*, which in turn will supply power to the motor 16*b* for rotating the motorized roller 6*b*. This roller 6*b* starts to pull the article into module 2*b*, and continues rotation for a given period of time until this article will completely transfer to this module, as seen in FIG. 5(*c*). The conveying apparatus 1 conveys the article from module 2*b* to module 2*e* sequentially by repeating such procedure as described above.

It will now be apparent that in the present apparatus 1 of the invention detection of any article on the conveying module 2 can be done merely by counting up the signal pulses generated in the rotating motor 16 in the motorized roller 6. Therefore, any conventional direct sensors can now be dispensed with, which have been indispensable to the prior art conveyors and have consequently increased the total number of constituent parts incorporated therein. Such a conveying apparatus 1 provided herein and lacking ordinary sensors is simplified in structure, manufactured inexpen-sively, rendering easier its assembling and maintenance works.

The weight of any article lying on conveying module 2 will probably produce against the motor 16 a rotational resistance of a noticeable intensity, lowering its rotational speed. Therefore, in the described embodiment the actual number 'Pr' of signal pulses generated by this motor 16 is utilized to know the state of said article relative to the conveying modules. However, in some cases, the articles may weigh too light to produce a sufficient resistance against rotation of the motors 16, failing to exactly detect the presence of said articles on said modules. Thus, a countermeasure may be adopted in the present invention such that the condition of rotating each motor 16 is inverted from one phase to another, or vice versa, at a time interval of 'T2'.

For example, the motor 16 in a module 2 may possibly be caused to make a sudden change in the direction of its rotation. In this case, the article on this module will follow such a sudden change. Then the inertial force of said moving article will produce a reaction acting on the motorized roller 6 and motor 16. A reaction resistance produced by such a light article, or resulting from any other relevant conditions of the system, is thus added to the normal resistance, i.e., owing to the weight, against this motor 16, thereby enabling an exact detection of this light article on the module 2.

In other modifications, the motor 16 may be switched over from its stationary state to its forward rotation, or vice versa, or from a higher speed to a lower speed, or vice versa, at regular intervals 'T2' of time. In all and any of these possible modes, a similar additional resistance produced by the inertial force of a light-weighing moving article, or resulting from any other conditions of this system, will be imparted to the motor 16. Any change in rotational condition of this motor will thus be amplified, also enabling an accurate detection of this light article on the module 2.

Figure 6A:
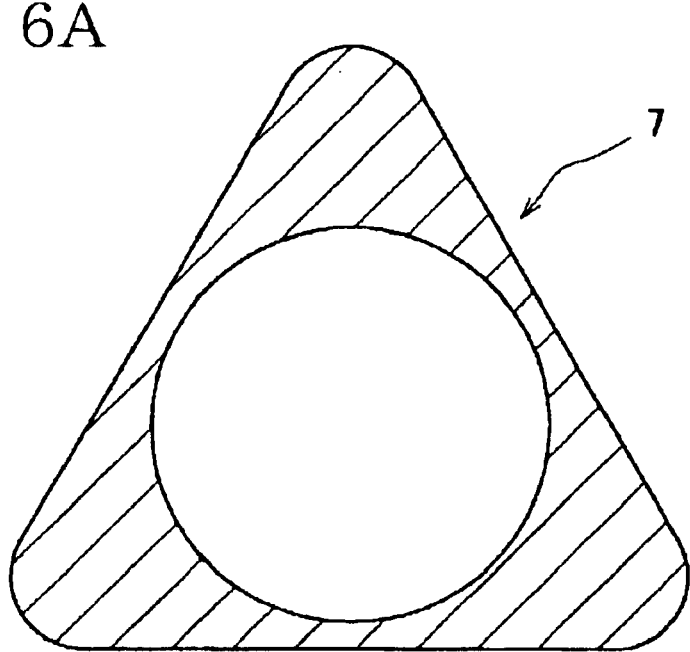
FIGS. 6(*a*) and 6(*b*) are modified cross sections of a roller body of the driven rollers or motorized roller included in the apparatus shown in FIG. 1.
Figure 6B:
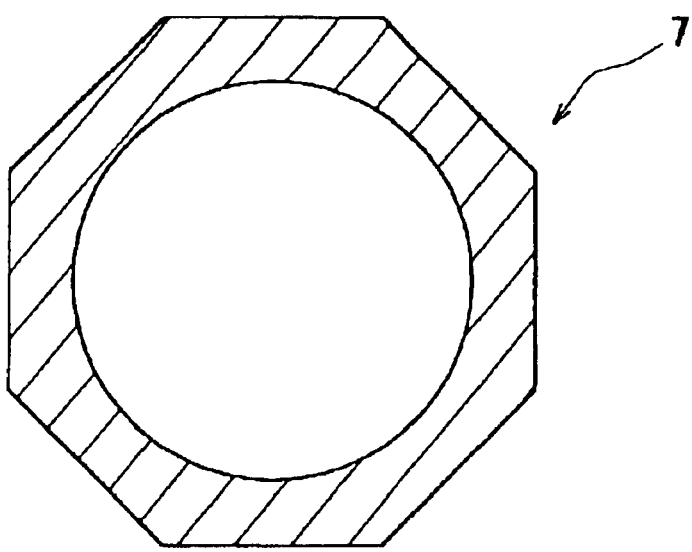

At least one of the driven rollers 5 and motorized driving rollers 6 may have a cylindrical roller body 7 of a polygonal cross section as shown in FIGS. 6(*a*) or 6(*b*). A larger contact area will be provided between such a roller and the article in this case such that the rotational resistance against the motor 16 of the driving roller 6 does noticeably increase. Accuracy of detection of the articles will thus be improved, as compared with the case wherein all the rollers are round in cross section.

Figure 7A:
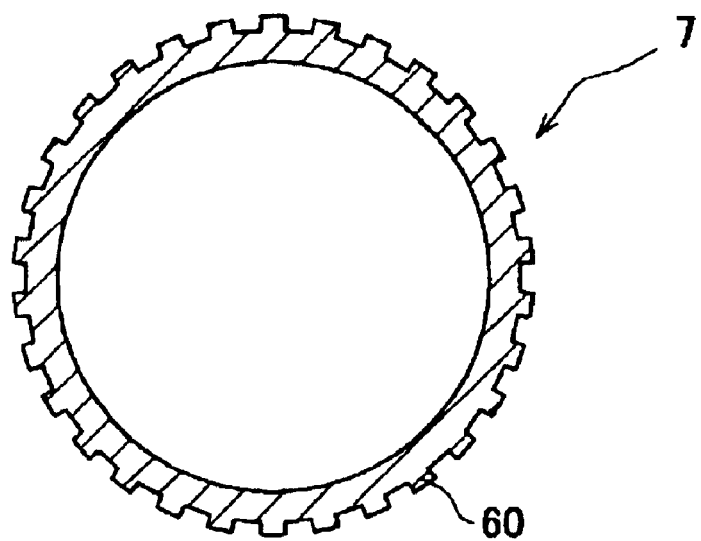
FIGS. 7(*a*) and 7(*b*) are further modified cross sections of a roller body of the driven rollers or motorized roller included in the apparatus shown in FIG. 1.
Figure 7B:
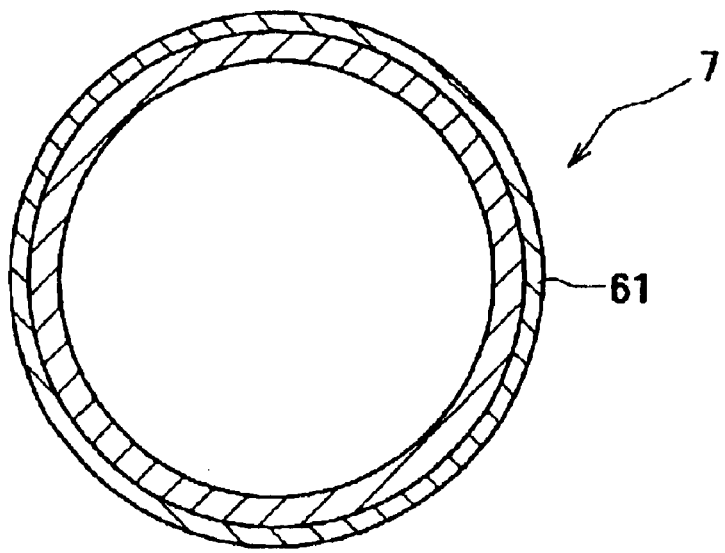

Alternatively, at least one of the driven rollers 5 and motorized driving rollers 6 may have a cylindrical roller body 7 with a rugged surface 60 (a rotation-resistant portion) as shown in FIG. 7(*a*), increasing the rotational resistance against the roller. The at least one of the driven rollers 5 and motorized driving rollers 6 may otherwise comprise a rubber sleeve 61 or the like rotation-resistant portion as shown in FIG. 7(*b*). Such a mantle or sleeve will likewise increase the rotational resistance against the roller and the motor, also improving the accuracy of detection of the articles.

As described above, a standard voltage 'V' is applied to the motor 16 in its idle state not loaded with any article, for the purpose of measuring the standard number 'P' of rotations. Thereafter, and during its normal operation, this motor loaded with the article is monitored to give the actual number 'Pr' of rotations. In the embodiment discussed above, comparison of 'Pr' with 'P' is carried out to judge whether any article is or is not being transported on the module. However, the present invention is not limited to such a system but may employ any compatible option for this purpose and to obtain data relating to rotational state of the motor 16. Such options may rely on detection of the velocity, direction, acceleration and/or angular distance of the motor's 16 rotation.

In one of such alternative options, the conveying apparatus 1 and its modules 2 may be designed such that the article-state detector 48 in motor-controlling section 45 produces the numbers 'P+' and 'P−' of signal pulses. The former number 'P+' indicates the sum of signal pulses generated during forward rotation of the motor within a given period 'T0' of time, with the latter number 'P−' indicating another sum of said pulses during reversed rotation also within the period 'T0'. A difference that will be found between these numbers 'P+' and 'P−' is used to determine the presence or absence of the article on any module.

Now, FIGS. 8 to 11 will be referred to describe the functions of components constituting the motor-controlling section 45. In these figures, the reference symbols 'P1' and 'P2' denotes the actual signal pulse waves themselves that will be transmitted from the Hall-effect elements 28*a* and 28*b*, respectively, during forward and reversed rotation of motor 16. Because the motor 16 is a three-phase motor, 3 (three) pulse train will be generated by an angular shift of 120° wherein 'P1' and 'P2' are two of them. During forward rotations, 'P1' will precede 'P2', and during reverse rotations 'P2' will precede 'P1'. Thus, the rotational direction of this motor can be known by inspecting which pulse 'P1' or 'P2' precedes the other.

The other reference 'P' denotes a superimposition of pulses 'P+' (for forward rotations) and 'P−' (for reverse rotations), and these being derived from the pulse trains 'P1' and 'P2'.

The condition selector 46 in the motor-controlling section 45 will be used to adopt the standard voltage 'V' at which the motor 16 rotates. This selector 46 will also operates to output a command signal to this motor for switching over its rotational direction, from forward to reverse, at the timing of 'T0/2'. This timing is the point midway in the course of time 'T0', as seen in FIGS. 8 to 11. The rotation detector 47 will sense the pole position signals emitted from the angular position sensor 25 during rotation of the motor 16. In this detector 47, these signals are modulated into the form of pulses that will then be output to the article-state detector 48.

This sensor 48 calculates the number 'P+' of signal pulses during forward rotation of motor 16 within the time period 'T0', as well as the other number 'P−' of said pulses during reversed rotation. In the article-state detector 48, a difference |P+−P−| will then be obtained in every case.

Figure 8:
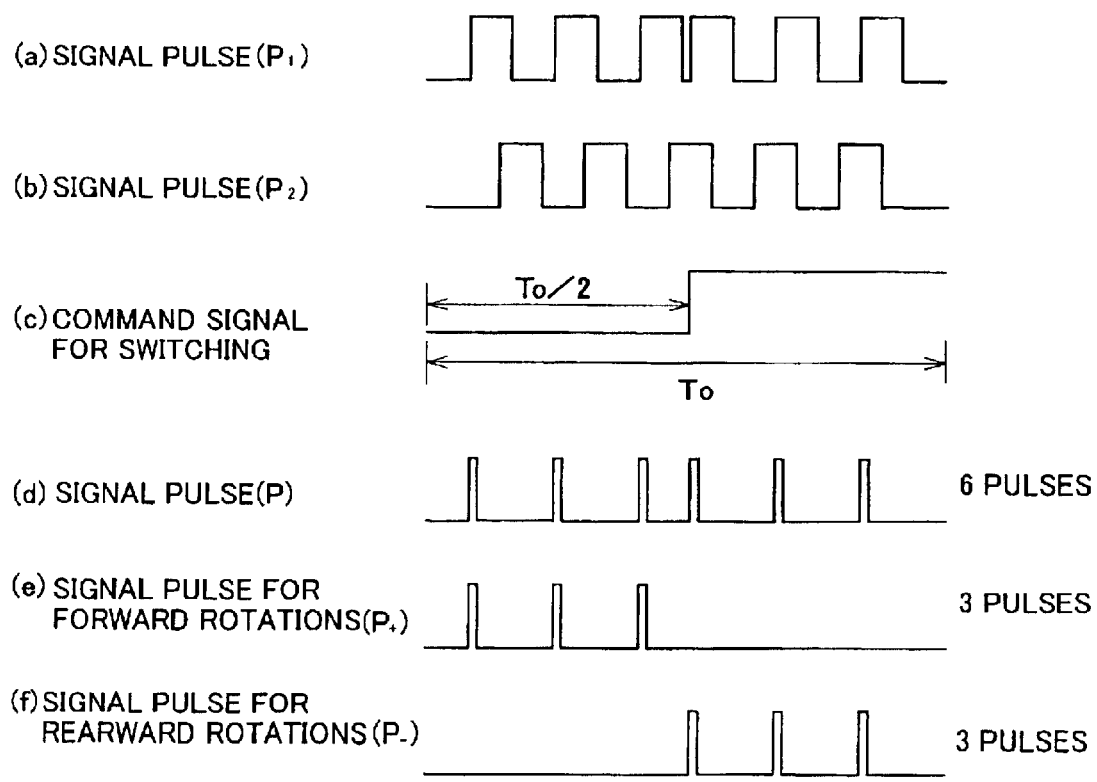
FIGS. 8(*a*) to 8(*f*) are time charts of signal pulses detected in an operational mode of the apparatus shown in FIG. 1.

If the conveying module 2 is not currently loaded with any article, then no substantial inertial force will affect the motor 16. Consequently, this motor will instantly change its rotational direction as shown in FIG. 8, when the command signal for switching over it is emitted from the condition selector 46. Thus, if 'P+' is 3 (three) for the time period 'T0', then 'P−' must also be 3 (three) also for the time period 'T0', making null the difference |P+−P−|. Accordingly, the article-state detector 48 determines that there is no article on the module in issue, before subsequently sending an article indicating signal to the adjacent-zone inspector 50.

If any article of an ordinary weight is advancing on and along the module 2, then a substantial inertial force will affect the motor 16. Consequently, this motor cannot instantly change its rotational direction as will be seen in FIG. 9, at the same time as the command signal for switching over the direction is emitted from the selector 46. Thus, even if 'P+' is 3 (three), 'P−' will be smaller than it and for example may be 2 (two), each within the time period 'T0'. In other words, if either of 'P+' and 'P−' is greater than the other, and the difference |P+−P−| is a number, for example, 1 (one), or larger integer. Accordingly, the article-state detector 48 determines that there is an article on the module in issue.

Figure 9:
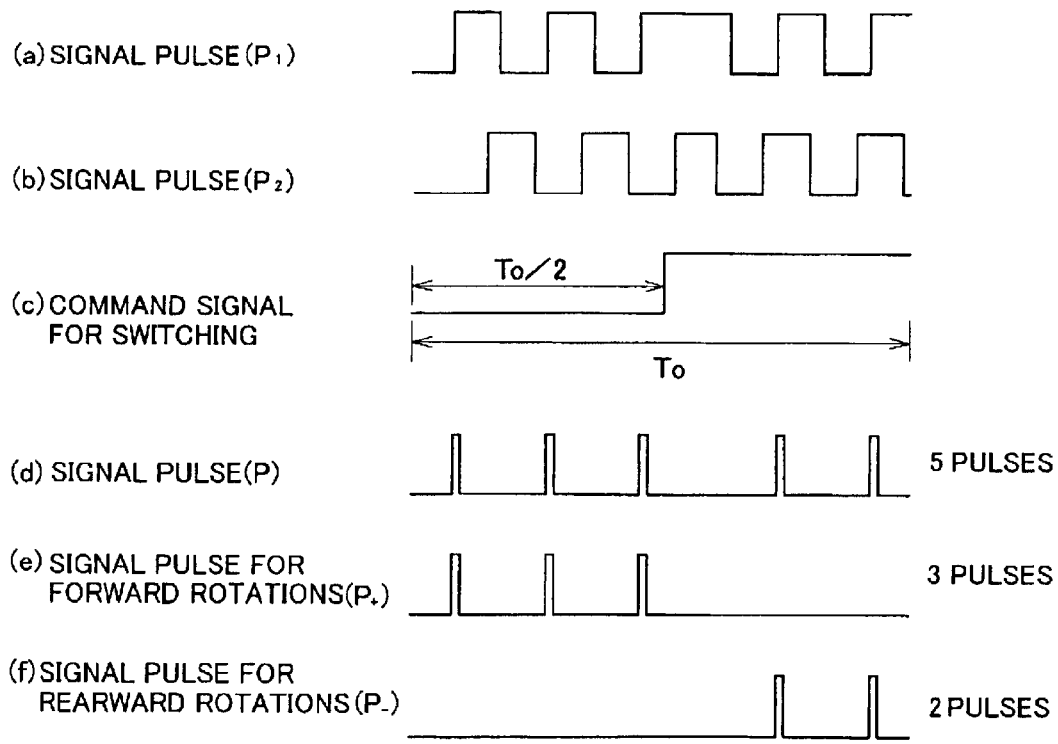
FIGS. 9(*a*) to 9(*f*) are time charts of signal pulses detected in another operational mode of the apparatus shown in FIG. 1.
Figure 10:
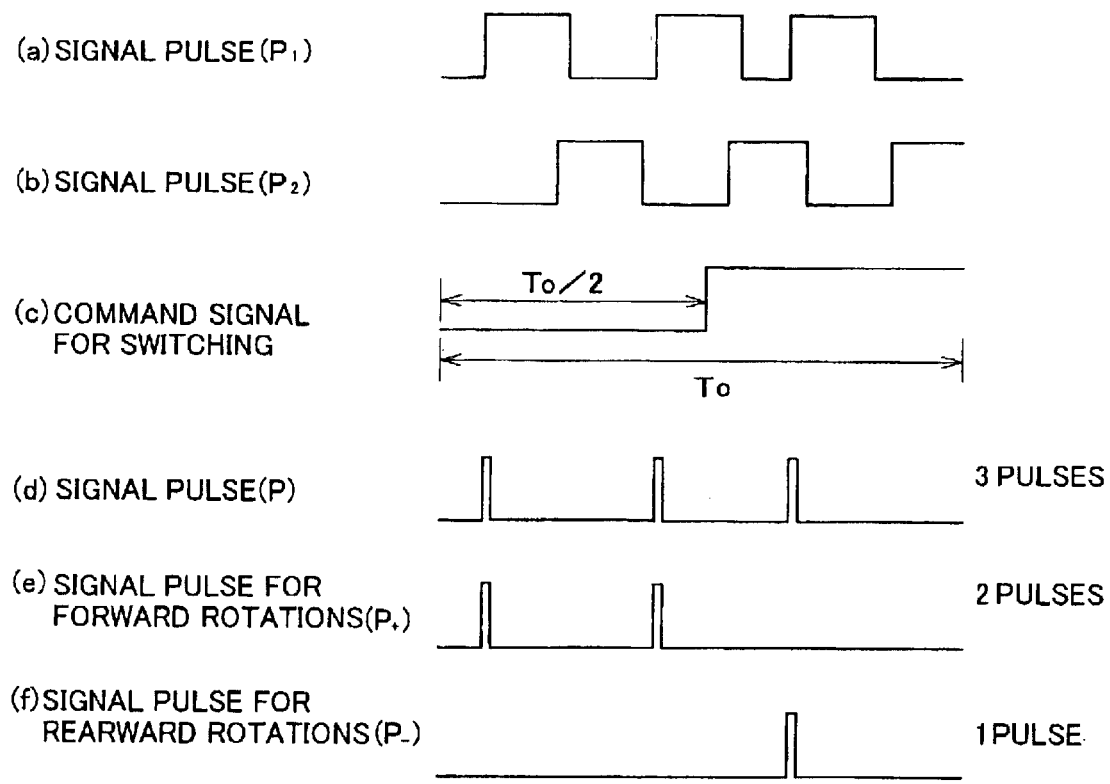
FIGS. 10(*a*) to 10(*f*) are time charts of signal pulses detected in a further operational mode of the apparatus shown in FIG. 1.
Figure 11:
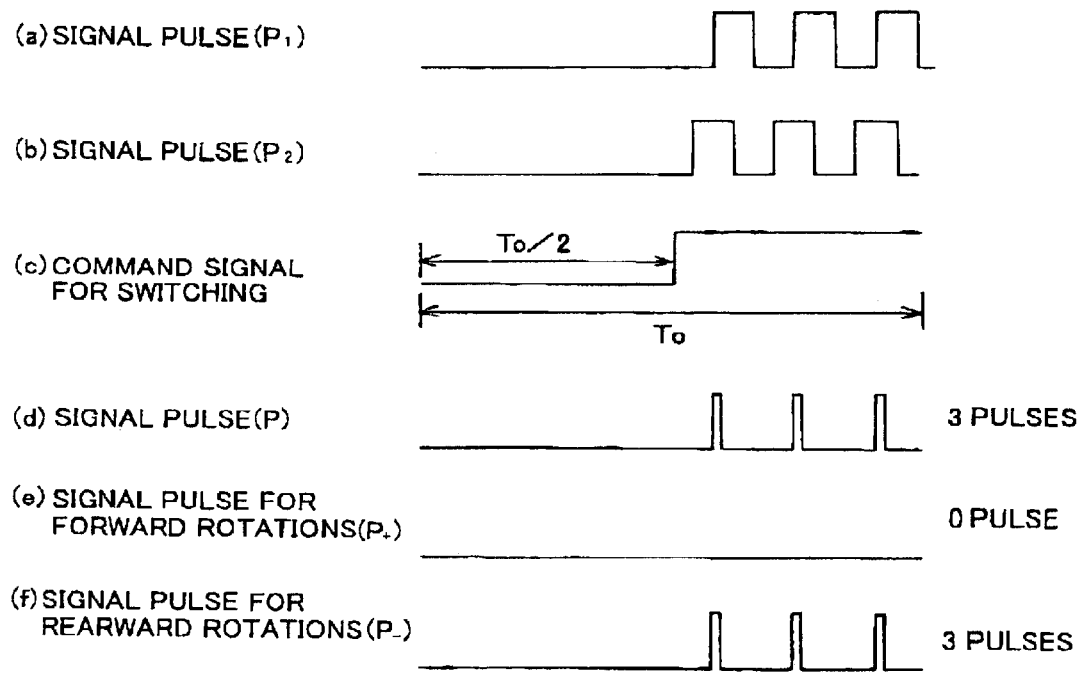
FIGS. 11(*a*) to 11(*f*) are time charts of signal pulses detected in a further operational mode of the apparatus shown in FIG. 1.

In a case wherein a much heavier article is on the module 2, 'P' that is the sum of those numbers 'P+' and 'P−' will be much less than that in the example shown in FIG. 9. For example, 'P' may be 3 (three) as illustrated in FIG. 10, meaning that the total of pulses generated within the time period 'T0' is just three. Thus, the value 'P' calculated in the article-state detector 48 may be helpful for the system to judge the weight of article.

In the mode described above, the value 'P+' denotes the counted-up number of forward rotations of motor 16 within the time 'T0', with the other 'P−' denoting that of reverse rotations. In the event that any article on the conveying module 2 would be stopped due to its contact with another article on the downstream side, only the pulses 'P−' corresponding to the reverse rotations of the motor will be generated, without being accompanied by any pulse 'P+' that represents the forward rotations.

These values 'P+' and 'P−' used in combination are useful to exactly detect the presence/absence of article and to obtain any other information thereon.

Although the conveying apparatus 1 of the mode exemplified above does rely on the difference between 'P+' as the number of forward rotations of motor 16 and 'P−' as that of reverse rotations within the time 'T0', when detection of articles is done. However, the present invention is not limited to this mode, but may be modified to use another difference |t+−t−| between 't+' and 't−' that respectively denote the length of a period of forward rotations and that of another period of reverse rotations. These values detected for a given period of time 'T0' within which the motor 16 continues to operate. Also in this modification, the presence/absence as well as weight of the articles can be judged on the basis of these values detected or calculated.

The conveying apparatus 1 described above comprises the controller 40 allocated to every conveying module 2. The article may be in some cases shorter than each of the modules, so that the motorized roller 6 and driven rollers 5 in one module can be controlled independently of those in thee other modules. These rollers 6 and 5 are thus turned on and off to transport the article exactly to its destination.

In this apparatus 1, each controller 40 receives moment by moment necessary data from the adjacent modules 2, as to their state loaded with the article or articles. Thus, there is no possibility that one article on the upstream module 2 would collide or interfere with the other article moving on and along the downstream module. If any article is so lengthy as to extend over two or more adjacent modules, then the motorized and driven rollers 6 and 5 installed therein will operate in a synchronous manner to smoothly transport that article.

In the conveying apparatus 1 of the described embodiment, the controllers 40 respectively belonging to the adjacent modules 2 are electrically connected one to another so as to cooperate with each other. By virtue of this structure, the present apparatus does not need any supervisory controller such as a programmable controller that has rendered so complicated the prior art conveyors. The communication cables 41 for connection of the adjacent modules 2 may be subjected to rearrangement between them to change the overall layout of apparatus 1.

Figure 12:
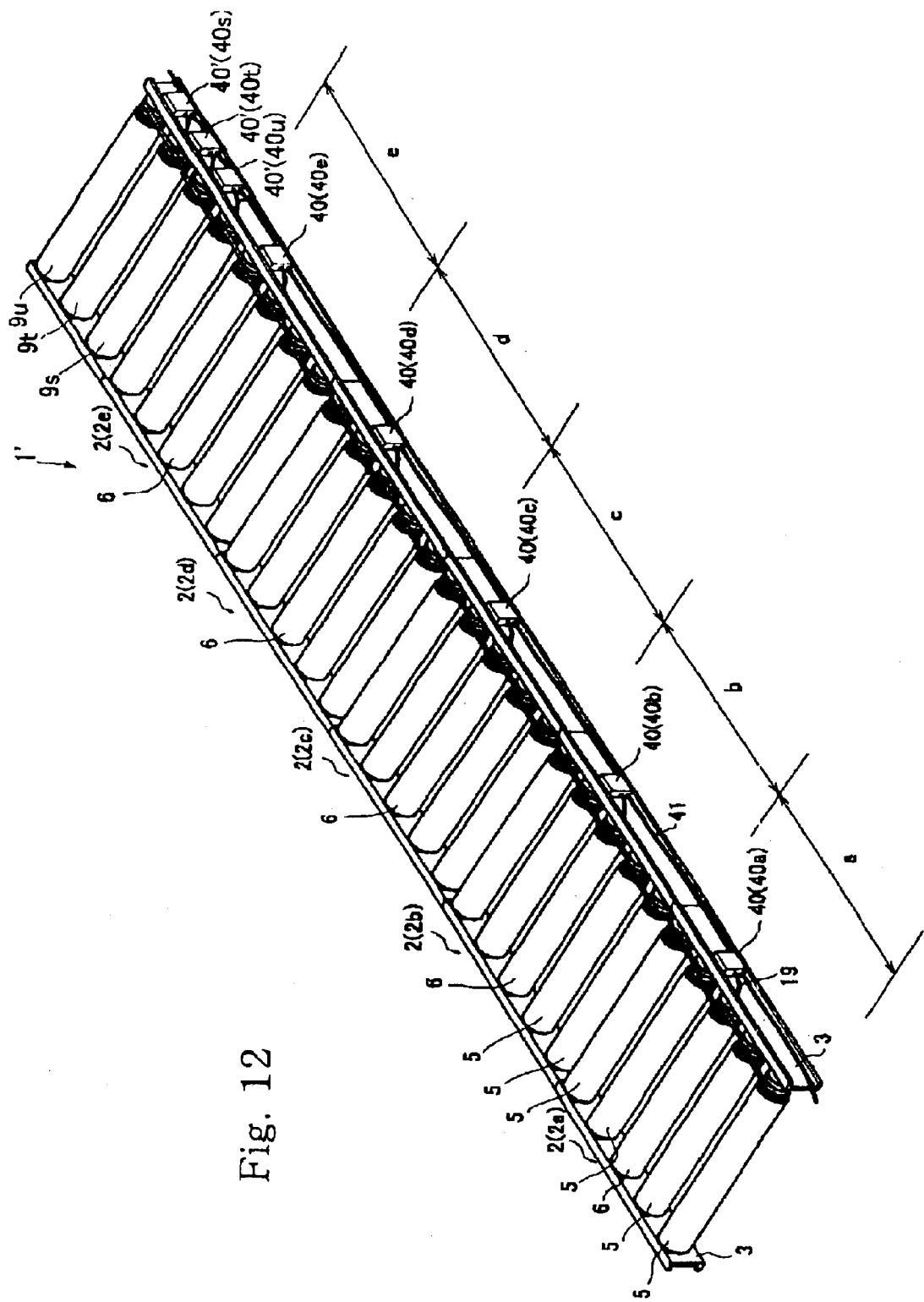
FIG. 12 is a perspective view of a conveying apparatus provided in accordance with another embodiment of the present invention.
Figure 13:
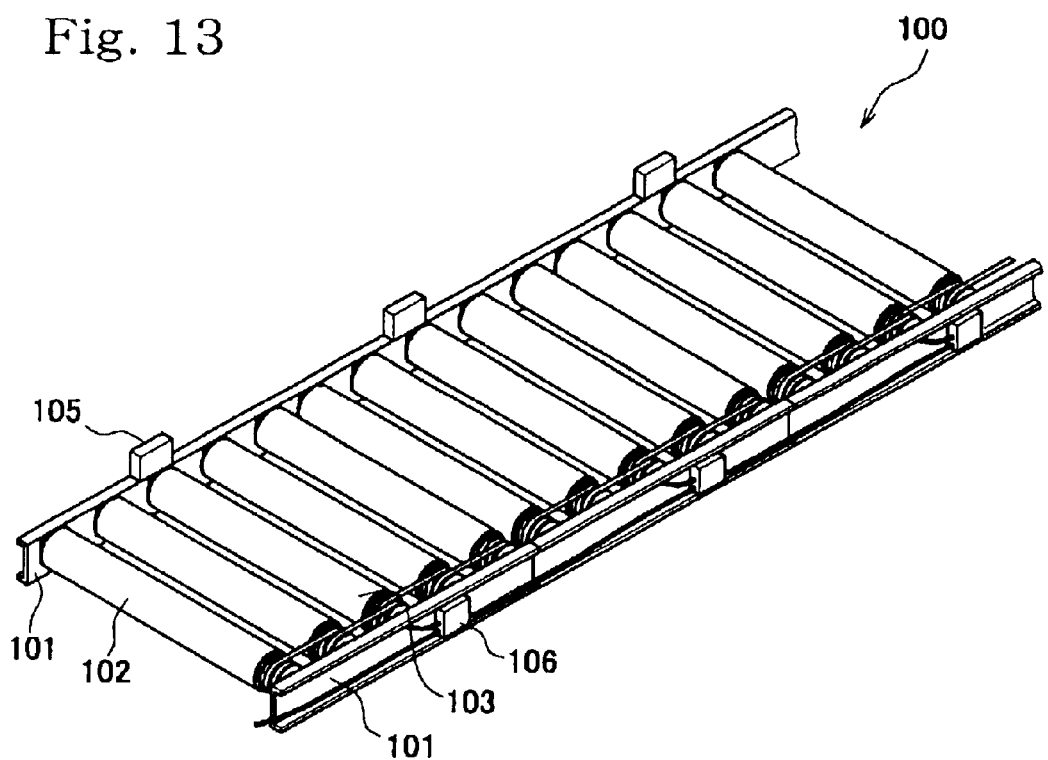
FIG. 13 is a perspective view of the prior art conveying apparatus.

Provided in another embodiment (shown in FIG. 12) is a conveying apparatus 1' comprising three braking motorized rollers 9 (viz., 9s, 9t and 9u, each having an auto-braking function) disposed in the downstream end region of transportation line. These rollers 9s, 9t and 9u are arranged in this order towards the end of said line end, and respectively and individually controlled by their own controllers 40' (viz., 40s, 40t and 40u). This apparatus 1' differs from that 1 of the first-described embodiment shown in FIG. 1, only with respect of those braking rollers 9 and controllers 40'. The braking rollers are each of the same internal structure as that of the motorized roller 6 shown in FIG. 3. Each braking roller 9 has installed therein a motor 16s, 16t and 16u (not shown), but is devoid of any mechanical brake shoes or the like. Each controller 40' is of the structure as that 40 shown in FIG. 4, but is not electrically linked with any other upstream or downstream controllers.

All the braking rollers 9 do not normally rotate, but remains still until any article reaches the end region such that this article's leading end rides on the upstream side braking roller 9s. Due to inertial force of this article, this roller 9s will continue for a while to make forced rotations (called hereinafter "forward rotations"), which in turn causes the motor 16s to make some forward rotations. As a result, pole position signals are output from an angular position sensor 25s and then delivered therefrom to a rotation detector 47s. A pulse train consequently generated in this detector will subsequently be input to an article-state detector 48s, thereby the counter in the detector 48s initiating therein the counting of those pulses.

The article-state detector 48s having received such a pulse train representing the "forward rotations" will then generate a motor driving signal to be fed to a motor actuator 52s. In response to this signal, the actuator 52s switches on the motor 16s, urging it to start "reverse rotations". Thus, a braking effect tends to take place against the motor's forced forward rotations, although a few signal pulses of forward rotations resulting from inertia will be emitted yet further until this motor 16s actually commences reverse rotations.

The article having ridden on the first braking roller 9s will make a further downstream motion to ride on the second and third braking rollers 9t and 9u, causing forced forward rotations thereof. Similarly to the first roller 9s, pulse trains consequently generated in the rotation detectors 47*t* and 47*u* will respectively be input to the article-state detectors 48*t* and 48*u*, thereby initiating therein the counting of those pulses. Also for these braking rollers 9*t* and 9*u*, these detector 48*t* and 48*u* having received such pulse trains representing the "forward rotations" will then generate respective motor driving signals to be fed to motor actuators 52*t* and 52*u*. In response to said pulse trains, these actuators 52*t* and 52*u* will switch on the motors 16*t* and 16*u*, urging them to start "reverse rotations".

In this way, all the braking rollers 9*s*, 9*t* and 9*u* are put into reverse rotations within a short time, thereby tending to push back the article. At the same time, angular position sensors 25*s*, 25*t* and 25*u* generate pole position signals in response to reverse rotations of the motors 16*s*, 16*t* and 16*u*. Those signals are fed to the respective rotation detectors 47*s*, 47*t* and 47*u* so as to produce therein signal pulses that will subsequently be transmitted to article-state detectors 48*s*, 48*t* and 48*u*. Thus, the numbers of signal pulses are counted up by the respective counters incorporated in said detector 48*s*, etc.

Motor actuators 52*s*, 52*t* and 52*u* will continue to drive the motors 16*s*, 16*t* and 16*u*, each in a reverse direction and for a time corresponding to the counted up number of the forward rotation pulses, to thereby keep the braking rollers 9*s*, 9*t* and 9*u* in reverse rotations. This system may preferably be designed such that the number of such positive rearward rotations of each braking roller 9*s*, etc. does coincide with the number of its forced forward rotations.

The most rearward one of the braking rollers 9*u* will have been forced to rotate the shortest angular distance, so that it will cease its positive rearward rotations earlier than the two other rollers 9*s* and 9*t*. At this point of timing, the leading end of the article that has been forced backwards will merely in a light touch with an upstream peripheral surface line of roller 9*u* so as to be located almost behind it. Likewise, at a later point of timing when the roller 9*t* stops, the leading end of the article that has been forced backwards further will merely in a light touch with an upstream peripheral surface line of the roller 9*t* so as to be located almost behind it. At the last instant, the leading end of the article that has been forced backwards still further will merely in a light touch with an upstream peripheral surface line of roller 9*s* so as to be located almost behind it.

In fact, a chronometrical interval found between the preceding timing at which the article had ridden the first braking roller 9*s* and the succeeding timing at which it has been pushed back over this roller is extremely short. Therefore, any observers will not be able to sense such an instantaneous incident, but they will view the article as if it has suddenly stopped at the destination.

Just discussed above is an example wherein the article shows a notice-able inertial and excessive forward advance beyond its destination, thus riding on the three braking rollers 9*s*, 9*t* and 9*u*. If its velocity when riding on the first braking roller 9*s* is much lower, then it will possibly be pushed back upon its riding on the first roller 9*s* only, or on the first and second ones 9*s* and 9*t*.

There might be an event that a succeeding article or any external force would strike and force forwards the preceding one that has been braked to stop exactly at such a destination. However, one or more of the braking rollers will instantly begin their backward rotations so as to return the preceding article without any delay. Thus, any observers will not be able to sense such a slight and instant motion of said preceding article, but they will view it as if it has been and is still in its quite stationary state at the destination.

Heretofore, mechanical braking mechanisms have been installed in those braking rollers. Such a prior art has raised a certain problem resulting from electrically actuated brake shoes or the like, that remain idle so long as power supply to them is maintained, for the purpose of safety. In other words, those brake shoes or the like will no longer be free, once power supply is cut off. Due to such a non-flexible braking mechanism, maintenance workers could not manually displace at all the articles along a non-actuated conveyor line.

This embodiment is devoid of such a prior art braking mechanism as composed of electrically driven brake shoes or the like. The braking rollers provided herein remain almost free even after power supply is cut off, and any resistance stronger than that which only a gear train does exert will not severely hinder manual rotations of said rollers. Thanks to the present flexible braking mechanism, the maintenance workers can manually displace easily the articles along a non-actuated conveyor line.

Without aid of any conventional sensors, each article can now be stopped at any desired point, for instance the most downward zone, of the conveyor line. The braking rollers employed herein are free of mechanical braking mechanism and constructed to be the same in structure as the non-braking motorized rollers. Owing to these features, the present conveying apparatus is thus simplified in overall structure.

The number of those braking rollers is not limited to 3 (three), but it may for example be 1 (one) so as to diminish the space for disposition of the braking zone. Contrarily to this case wherein the single roller must perform a relatively heavy duty, the number of braking rollers may be increased to 4 (four) or more to lighten the duty of individual roller, resulting a wider space for them.

In order to adjust or change the precise point of stopping each article, the system described above may be modified such that the (former) number of pulses indicating the positive rearward rotations is not the same as the (latter) number indicating forced forward rotations. Any adequate mathematical or functional relationship may be introduced between these numbers of pulses.

In an example, the former number may be preset to be somewhat less than the latter number, so that each article will stop at such a position that its leading portion rests wholly or partially on at least one of the braking rollers.

There is a possibility that, due to slippage or the like cause, the same former and latter numbers might result in an offset of the actual position from any target position at which each article has to stop. In such an event, experiments will be useful to seek an optimum mathematical relationship to be preset between those numbers.

On the other hand, there has been observed a further problem in the slug mode of transportation, as follows.

Figure 14:
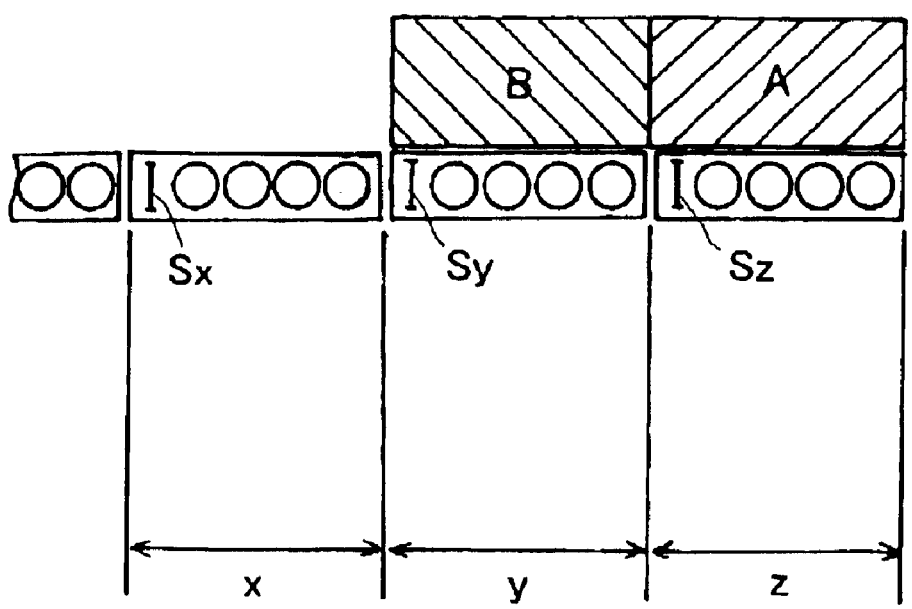
FIG. 14 is scheme illustrating the downstream end portion in the prior art apparatus shown in FIG. 13.

In FIG. 14, a conveying zone 'z' is the last zone, and 'y' is the last but one and located adjacent to the former zone 'z', wherein load sensors are used to detect the positions of articles. An article 'A' rests still on the last zone 'z', with another article 'B' lying on the 'last but one' zone 'y'. The rollers in the latter zone 'y' will be actuated only when any article is detected therein, but no article being detected in the former (viz., downstream) zone 'z'. The articles 'A' and 'B' are in contact with each other, but one of the sensors 'Sz' intervening between them may possibly misjudge that there is no article on the downstream zone 'z' due to a light load which it 'Sz' is sensing. However, the article 'B' contacting 'A' (and in a jammed state) can no more move in a downstream direction. As a result, the rollers in zone 'y' bearing the article 'B' continues to rotate, commanded by the sensor 'Sy' then sensing it, thereby causing energy loss.

This drawback has not been a matter foreign to other cases wherein actuation of rollers in a zone is decided only on by detecting the presence of any article in this zone. In detail, the article in the downstream zone may be stopped or decelerated, caused by any disorder or the like in this system, giving rise to such a problem.

The above-described problems can occur even on the conveying apparatus having such motorized rollers for detecting articles as disclosed in this application.

Figure 15:
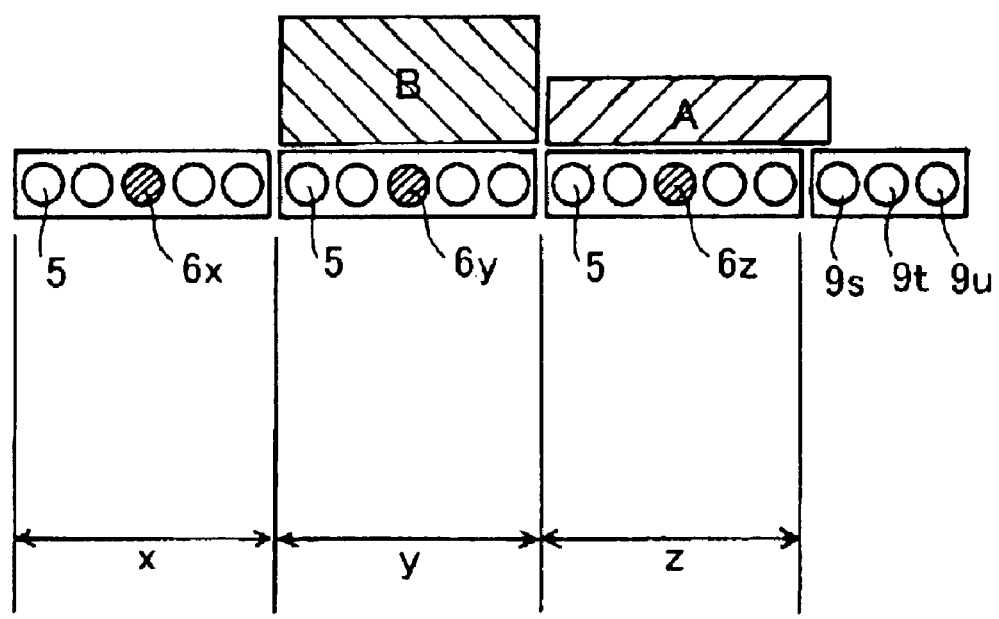
FIG. 15 is scheme illustrating the downstream end portion of the apparatus of the present invention.

For example, as shown in FIG. 15, when an article 'A' resting on the last zone 'z' is not detected by means of a motorized roller 6z functioning as a sensor in zone 'z' because the article 'A' is too light, roller in the 'last but one' zone 'y' will be actuated because article 'B' is detected by means of a motorized roller 6y functioning as a sensor in zone 'y'. However, the article 'B' contacting the article 'A' (and in a jammed state) can no more move in a downstream direction, as the article 'A' is forbidden to move downward by braking motorized rollers 9s, 9t and 9u. As a result, the roller in zone 'y' bearing the article 'B' continues to rotate, thereby causing energy loss.

In another case, like in FIG. 14, when the roller 6z functioning as a sensor intervenes between articles 'A' and 'B', and when article 'B' is detected by means of the roller 6y, the roller in zone 'y' bearing the article 'B' continues to rotate, thereby causing energy loss.

The following proposal was made herein to diminish such an energy loss prone to occur in the various types of conveying apparatuses.

Details of this proposal are as follows. It is an ordinary case that the motorized roller 6d in the conveying zone 'd' has detected the presence of an article, with the downstream motorized roller 6e in the succeeding zone 'e' however indicating absence of article therein. The action commander 51e in controller 40e of the downstream zone 'e' will consequently generate and transmit a transportation commanding signal to the commander 51d in the upstream zone 'd'. Upon such a transmission of said signal, this upstream commander 51d will actuate the motor 16d so as to put into operation the upstream motorized roller 6d in zone 'd' for the length of time 'T1'. This time 'T1' may have been preset properly in view of a time required to drive the article by one zone, and for instance about several seconds.

When the motor 16d has just operated for the time 'T1' at an instant, normally the rotation detector 47 in this zone will nevertheless continue after this instant for a time to generate and emit further signal pulses. This is due to inertial motions of the roller 6d and motor 16d, usually indicating that the article has already departed from the motorized roller 6d or is still being moved forwards by it, at the said instant.

Occurrence of such a phenomenon may be confirmed by judging whether the number of 'inertial' pulses from the motor 16d within a time 'T3' is greater than a threshold. If yes, then those motorized rollers 6d, 6e, etc. will resume their operation to detect articles. If in consequence the action commander 51d receives transportation commanding signal, then it will actuate again the motor 16d of roller 6d in the zone 'd', thus keeping this roller in operation for a time 'T1'.

At the above-noted instant that the motor 16d has just operated for the time 'T1', the article may occasionally stand still on the roller 6d yet, due to the jammed state of this conveyor line. In this case, this motorized roller biased downwards by the article will not make any inertial rotations at all, or the number thereof will extremely be smaller than that in the normal case noted above.

In detail, if the number of 'inertial' pulses from the motor 16d within a time 'T3' is smaller than the threshold, then the roller 6d still loaded with the article is making a very small number of inertial rotations. In an extreme instance that the number of 'inertial' pulses is 0 (zero), the motorized roller 6d is probably in its quite stationary state, being pressed down with the article.

In these instances just mentioned, the conveyor line will be determined to be jammed with articles such that the article on the upstream roller 6d has come into an urged contact with a preceding article on the downstream roller.

The 'threshold' for the number of inertial rotations may be predetermined by experiments and taking into account the variation in said number in usual cases. For example, it may preferably be selected to be slightly smaller than a median found in the varying actual numbers.

If the number of inertial pulses detected within a time 'T3' is smaller than the threshold (or '0' in the extreme cases), then the action commander 51d will keep the motor 16d stopped, in disregard of any outstanding transportation commanding signal.

Such an interruption in actuation of the motor 16d will be effective to minimize energy loss.

Also for this purpose, the above-described action of the roller 6d for detecting article may be stopped to save energy in such cases, since the article has already been detected by that time.

After a preset time 'T4' from stoppage of motor 16d, the article-state sensing function for the rollers 6d and 6e will be resumed to make the decisions mentioned above, in order to put the system into its normal operation.

The rotation detector in the present apparatus operates to obtain the data with respect to the state of each roller or each motor, thereby enabling detection of article on each module, as to its presence/absence, its weight, any disorder in transportation the article, and the like. Thus, any conventional and discrete sensors inherent in the prior art apparatuses are no longer necessary to such a precise detection of the state of articles that are to be transported to correct destinations.

Such a conveying apparatus provided herein and lacking the conventional and discrete sensors for detection of article being transported is simplified in structure, manufactured inexpensively, rendering easier its assembling and maintenance works.

The following terminology, as used in the claims, herein, is defined as follows. The term "rotating state" inclusively denotes velocity, direction, acceleration/deceleration, angular distance, duration and the like of rotation of the roller. The term "rotational condition" inclusively denotes velocity, direction, acceleration/deceleration, angular distance, duration and the like of rotation of the motor.

The embodiments described above do merely give some exemplary modes included in the broad scope of the present invention, and therefore are not intended to delimit it.

What is claimed is:

1. A conveying apparatus comprising:
   a plurality of rollers for conveying an article,
   a motor for driving at least one of the rollers in rotation, and
   a controller for controlling operation of the motor,
   the controller comprising a rotation detector for obtaining actual information with respect to a rotating state of the at least one roller, which rotating state is at least one of a) rotational velocity, b) rotational direction, c) rotational acceleration, d) rotational deceleration, e) rotational distance, and f) rotational direction, for the at least one roller with a voltage applied to the motor, and the controller further comprising an article-state detector such that the actual information for the at least one roller will be compared with standard information representing a reference rotating state of the at least one roller expected when a voltage is applied to the motor, wherein on the basis of a difference found between the actual information and the standard information at least one of a) the presence or absence, b) weight, and c) normality or abnormality in motion of an article on the at least one roller will be determined.

2. A conveying apparatus as defined in claim 1, wherein the rotation detector is constructed such that the rotating state of the at least one roller is determined based on information with respect to a rotational condition of the motor, which rotational condition is at least one of a) rotational velocity, b) rotational direction, c) rotational acceleration, d) rotational deceleration, e) rotational distance, and f) rotational direction for the motor.

3. A conveying apparatus as defined in claim 1, wherein the controller is constructed to determine whether any article is or is not present on the at least one roller, by comparing a value indicative of an actual rotating value of the at least one roller with a preset reference value, wherein the actual rotating state is detected by the rotation detector, and the preset reference value corresponds to an empty state of the apparatus wherein no article is loaded on the at least one roller.

4. A conveying apparatus as defined in claim 1, wherein the controller is designed to detect that an article on the at least one roller has collided with an obstacle, when the rotation detector detects a smaller number of rotations of the at least one roller over a predetermined time period than a reference number of rotations over the predetermined time period.

5. A conveying apparatus as defined in claim 1, wherein the controller is designed to change the operation of the motor for the purpose of test, between at least one of a) a stationary mode and a forward rotary mode, b) a forward rotary mode and reversed rotary mode, and c) a faster rotary mode and a slower rotary mode so that a change in the mode of the motor is used to determine a current rotating state of the at least one roller.

6. A conveying apparatus as defined in claim 1, wherein the controller is designed to cause at given regular intervals of time the motor to make an intentional and sudden change in a rotational condition, which rotational condition is at least one of a) rotational velocity, b) rotational direction, c) rotational acceleration, d) rotational deceleration, e) rotational distance, and f) rotational direction for the motor in order to check the rotating state of the at least one roller.

7. A conveying apparatus as defined in claim 1 wherein a signal pulse train is generated in response to operation of the motor that is driving the at least one roller in rotation, so that the rotation detector counts up the number of signal pulses output from the motor in a set time period to determine the actual rotational speed of the at least one roller.

8. A conveying apparatus as defined in claim 1, wherein a signal pulse train is generated in response to operation of the motor, and the rotation detector obtains the information on the at least one roller's rotating state on the basis of such pulses, and wherein the article-state detector compares the detected number of actual signal pulses with a reference number of pulses representative of the conveying apparatus in an idle operation state, so that if the actual number and reference number are equal or nearly equal to each other, then the conveying apparatus will be regarded as having no article thereon.

9. A conveying apparatus as defined in claim 1, wherein a signal pulse train is generated in response to rotation of the motor, and the rotation detector monitors the at least one roller's rotating state on the basis of such pulses, and wherein the article-state detector compares the detected number of the actual pulses with a reference number of pulses representative of the conveying apparatus being in an idle operation state, so that if a difference between the actual number and reference number is equal to or less than another predetermined limit, the conveying apparatus will be regarded as being loaded with an article.

10. A conveying apparatus as defined in claim 1, wherein a signal pulse train is generated in response to rotation of the motor, and the rotation detector monitors the at least one roller's state on the basis of such pulses, and wherein the article-state detector compares a reference number of pulses with the actual number of pulses having been counted up during a predetermined length of time just after operation of the motor for another predetermined length of time, so that if the actual number is less than the reference number, then an article on the conveying apparatus will be regarded as having collided with an obstacle.

11. A conveying apparatus as defined in claim 1, wherein a signal pulse train is generated in response to rotation of the motor, and the rotation detector monitors the at least one roller's state on the basis of such pulses, and wherein the article-state detector compares the actual number of pulses, which number is counted up during a unit time of forward operation of the at least one roller, with the other actual number being counted after rotational direction of the at least one roller is reversed, so that a difference found between these actual numbers will be utilized to determine whether any article is present or absent on the conveying apparatus.

12. A conveying apparatus as defined in claim 1, wherein the rollers on the conveying apparatus are caused to rotate in response to an article being placed on the conveying apparatus.

13. A conveying apparatus as defined in claim 1, wherein the apparatus comprises a plurality of conveying zones arranged to form a row, each conveying zone comprising a plurality of rollers for conveying an article, a motor for driving at least one of the rollers in rotation, and a controller for controlling operation of the motor, wherein each of the controllers disposed in the respective zones is adapted to receive data or information generated in adjacent zones with respect to presence or absence of articles on the conveying apparatus.

14. A conveying apparatus as defined in claim 13, wherein each of the controllers comprises an adjacent-zone inspector and an action commander, such that if and when an article is found on an upstream zone, an action commander in the controller of a downstream zone will generate and transmit a transportation commanding signal to another action commander in the other controller of the upstream zone, whereby the action commander in the upstream zone will operate to turn on the motor therein to drive and rotate the at least one roller in the upstream zone.

15. A conveying apparatus as defined in claim 1, wherein in the event that a power supply to the motor is cut off, the at least one roller is forcibly driven to rotate in the event that the rotation detector for that motor detects rotation thereof, resuming power supply to the motor.

16. A conveying apparatus as defined in claim 1, wherein the conveying apparatus includes at least a first of the rollers that serves as a brake and is driven by a first motor, which in turn is regulated by a controller comprising a rotation detector for monitoring rotations of the first motor, so that the first motor will be caused on demand to rotate in a reverse direction opposite to a forward direction of rotation for the first roller, to thereby brake the first roller.

17. A conveying apparatus as defined in claim 1, wherein at least one of the rollers on the conveying apparatus comprises a fixed shaft, a roller body capable of rotating freely relative to the shaft, and a motor accommodated in the roller body, so that a torque of the motor in the roller body will be transmitted to the roller body, making the roller body rotate about the shaft, when the motor in the roller body is actuated.

18. A conveying apparatus comprising:
a plurality of rollers for conveying an article,
a motor for driving at least one of the rollers in rotation, and
a controller for controlling operation of the motor,
the controller comprising a rotation detector for obtaining actual information with respect to a rotational condition of the motor, which rotational condition is at least one of a) rotational velocity, b) rotational direction, c) rotational acceleration, d) rotational deceleration, e) rotational distance, and f) rotational direction, for the motor with a voltage applied to the motor, and
the controller further comprising an article-state detector such that the actual information will be compared with reference information representing expected information representative of operation of the motor in an idle state with a voltage applied to the motor,
wherein on the basis of a difference found between the actual information and the reference information, at least one of a) the presence or b) absence of an article on the conveying apparatus will be determined.

19. A conveying apparatus as defined in claim 18, wherein the controller is designed to change the operation of the motor for the purpose of test, between at least one of a) a stationary mode and a forward rotary mode, b) a forward rotary mode and a reversed rotary mode, and c) a faster rotary mode and a slower rotary mode.

20. A conveying apparatus as defined in claim 19, wherein a signal pulse train is generated in response to rotation of the motor, and the rotation detector obtains the information on the at least one roller's rotating state on the basis of such pulses, which rotating state is at least one of a) rotational velocity, b) rotational direction, c) rotational acceleration, d) rotational deceleration, e) rotational distance, and f) rotational direction, for the at least one roller, and wherein the article-state detector compares the detected number of actual signal pulses with a reference number of pulses with the conveying apparatus in an idle operation state, so that if the actual number and reference number are equal or nearly equal to each other, then the conveying apparatus will be regarded as having no article thereon.

21. A conveying apparatus as defined in claim 19, wherein a signal pulse train is generated in response to rotation of the motor, and the rotation detector monitors the at least one roller's rotating state on the basis of such pulses, which rotating state is at least one of a) rotational velocity, b) rotational direction, c) rotational acceleration, d) rotational deceleration, e) rotational distance, and f) rotational direction, for the at least one roller, and wherein the article-state detector compares the detected number of the actual pulses with a reference number of pulses with the conveying apparatus in an idle operation state, so that if a difference between the actual number and reference number is equal to or less than another predetermined limit, the conveying apparatus will be regarded as being loaded with an article.

22. A conveying apparatus comprising:
a plurality of rollers for conveying an article,
a motor for driving at least one of the rollers in rotation, and
a controller for controlling operation of the motor,
the controller comprising a rotation detector for obtaining actual information with respect to a rotational condition of the motor, which rotational condition is at least one of a) rotational velocity, b) rotational direction, c) rotational acceleration, d) rotational deceleration, e) rotational distance, and f) rotational direction for the motor, and
the controller further comprising a collision indicator such that a reference number of rotations is compared with an actual number of rotations determined by the rotation detector during a predetermined length of time when the motor is expected to rotate, so that if the actual number is less than the reference number, then an article on the conveying apparatus will be regarded as having collided with an obstacle.

23. A conveying apparatus as defined in claim 22, wherein the controller is designed to change the operation of the motor for the purpose of test, between at least one of a) a stationary mode and a forward rotary mode, b) a forward rotary mode and a reversed rotary mode, and c) a faster rotary mode and a slower rotary mode.

* * * * *